(12) United States Patent
Sato et al.

(10) Patent No.: US 11,025,155 B2
(45) Date of Patent: Jun. 1, 2021

(54) POWER SUPPLY CONTROL DEVICE FOR SETTING MINIMUM ON WIDTH OF OUTPUT SWITCH

(71) Applicant: Rohm Co., Ltd., Kyoto (JP)

(72) Inventors: Yoshinori Sato, Kyoto (JP); Satoru Nate, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 56 days.

(21) Appl. No.: 16/353,031

(22) Filed: Mar. 14, 2019

(65) Prior Publication Data

US 2020/0089295 A1  Mar. 19, 2020

(30) Foreign Application Priority Data

Sep. 19, 2018 (JP) .............. JP2018-175074

(51) Int. Cl.
| | |
|---|---|
| *H02M 1/32* | (2007.01) |
| *H02J 7/00* | (2006.01) |
| *G06F 1/26* | (2006.01) |
| *H02M 1/00* | (2006.01) |
| *H02M 3/335* | (2006.01) |

(52) U.S. Cl.
CPC ............ *H02M 1/32* (2013.01); *H02J 7/0088* (2013.01); *G06F 1/263* (2013.01); *H02M 3/33523* (2013.01); *H02M 2001/0025* (2013.01); *H02M 2001/0032* (2013.01); *H02M 2001/0035* (2013.01); *Y02B 70/10* (2013.01)

(58) Field of Classification Search
CPC ............ H02M 3/335; H02M 3/33507; H02M 3/33523; H02M 7/04; H02M 7/12; H02M 7/155; H02M 7/1555; H02M 1/38; H02M 2001/0003; G06F 1/263; G06F 1/26; H02J 7/0088
See application file for complete search history.

(56) References Cited

U.S. PATENT DOCUMENTS

| | | | |
|---|---|---|---|
| 2013/0033248 A1* | 2/2013 | Granger | H02M 3/1588 323/288 |
| 2013/0033902 A1* | 2/2013 | Zhang | H02M 7/2176 363/15 |
| 2013/0128627 A1* | 5/2013 | Moon | H02M 3/33507 363/21.17 |
| 2014/0084885 A1* | 3/2014 | Ouyang | H02M 3/158 323/271 |
| 2016/0028311 A1* | 1/2016 | Murakami | H02M 3/1588 323/271 |
| 2016/0268907 A1* | 9/2016 | Chen | H02M 3/33507 |
| 2016/0358705 A1* | 12/2016 | Lin | H01F 27/06 |

FOREIGN PATENT DOCUMENTS

JP  2014-112996  6/2014

* cited by examiner

*Primary Examiner* — Thienvu V Tran
*Assistant Examiner* — Shahzeb K Ahmad
(74) *Attorney, Agent, or Firm* — Fish & Richardson P.C.

(57) ABSTRACT

There is provided a power supply control device as a control main entity of a switching power supply. The power supply control device includes a minimum ON width setting part configured to set a minimum ON width of an output switch according to a load.

8 Claims, 17 Drawing Sheets

POWER SUPPLY CONTROL DEVICE FOR SETTING MINIMUM ON WIDTH OF OUTPUT SWITCH

CROSS-REFERENCE TO RELATED APPLICATION

This application is based upon and claims the benefit of priority from Japanese Patent Application No. 2018-175074, filed on Sep. 19, 2018, the entire contents of which are incorporated herein by reference.

TECHNICAL FIELD

The present disclosure relates to a power supply control device.

BACKGROUND

Conventionally, power supply control devices (so-called power supply ICs) have been widely and generally used as a main control unit of an isolated switching power supply.

In conventional power supply control devices, however, there was a room for further improvement in reduction of power consumption in case of a light load or no load.

SUMMARY

The present disclosure provides some embodiments of a power supply control device capable of reducing power consumption at light load or no load.

According to one embodiment of the present disclosure, there is provided a power supply control device as a main control unit of a switching power supply, including a minimum ON width setting part configured to set a minimum ON width of an output switch according to a load.

DETAILED DESCRIPTION

Figure 1:
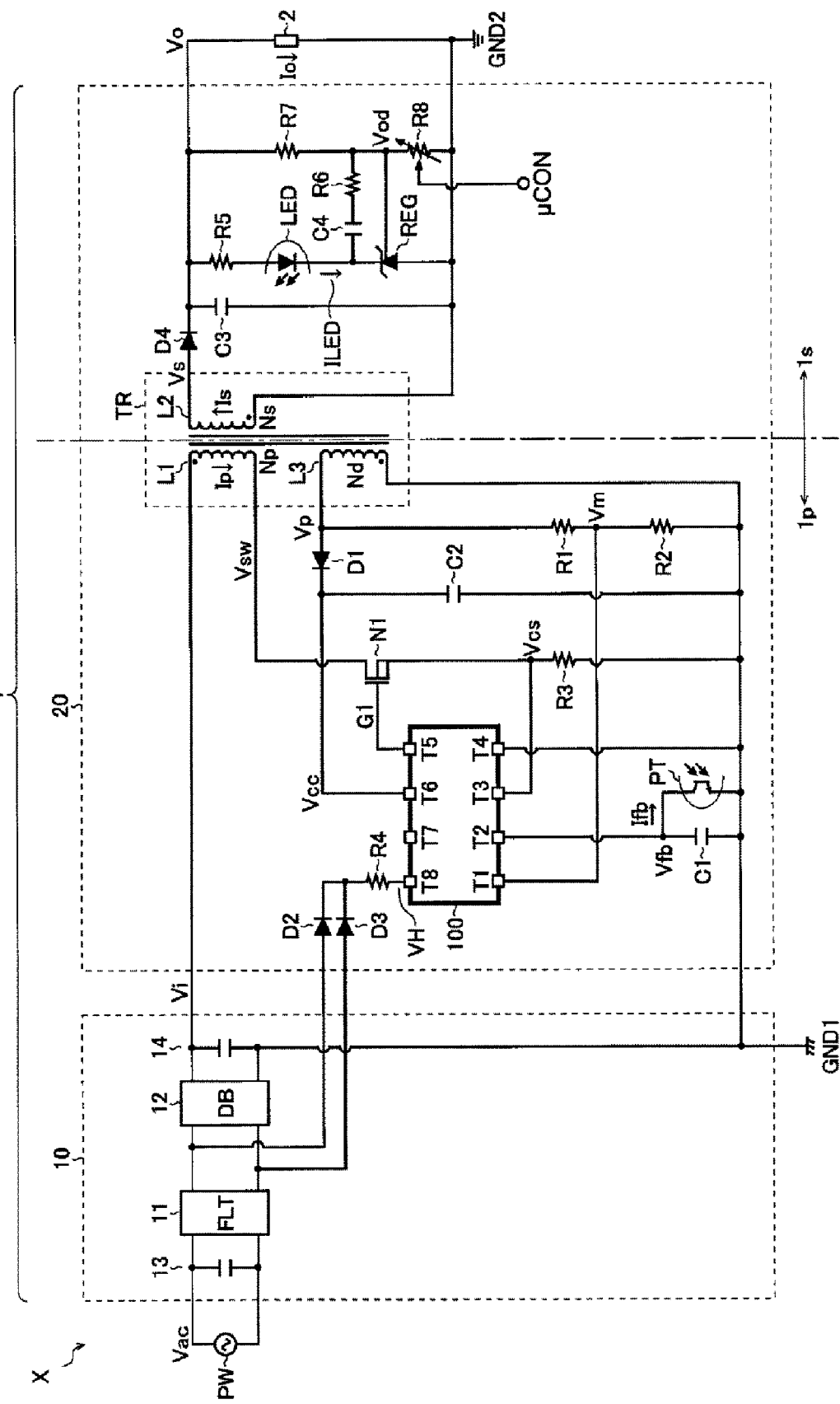
FIG. 1 is a diagram illustrating an overall configuration of an electronic device having an isolated switching power supply.

Embodiments of the present disclosure will be now described in detail with reference to the drawings. Like or equivalent components, members, and processes illustrated in each drawing are given like reference numerals and a repeated description thereof will be properly omitted. Further, the embodiments are presented by way of example only, and are not intended to limit the present disclosure, and any feature or combination thereof described in the embodiments may not necessarily be essential to the present disclosure.

<Isolated Switching Power Supply>

FIG. 1 is a diagram illustrating an overall configuration of an electronic device having an isolated switching power supply. An electronic device X of this configuration example includes an isolated switching power supply 1 and a load 2, which operates by receiving electric power supplied from the isolated switching power supply 1.

The isolated switching power supply 1 is a means which electrically isolates a primary circuit system 1$p$ (GND1 system) and a secondary circuit system 1$s$ (GND2 system) from each other, and converts an AC input voltage Vac (e.g., AC 85 to 265 V), which is supplied from a commercial AC power supply PW to the primary circuit system 1$p$, into a desired DC output voltage Vo (e.g., DC 10 to 30 V), and supplies the DC output voltage Vo to the load 2 of the secondary circuit system 1$s$. The isolated switching power supply 1 includes a rectification part 10 and a DC/DC conversion part 20.

The rectification part 10 is a circuit block which generates a DC input voltage Vi (e.g., DC 120 to 375 V) from the AC input voltage Vac, and supplies the DC input voltage Vi to the DC/DC conversion part 20. The rectification part 10 includes a filter 11, a diode bridge 12, and capacitors 13 and 14. The filter 11 removes a noise or surge from the AC input voltage Vac. The diode bridge 12 full-wave rectifies the AC input voltage Vac to generate the DC input voltage Vi. The capacitor 13 removes a harmonic noise of the AC input voltage Vac. The capacitor 14 smooths the DC input voltage Vi. In addition, a protective element such as a fuse or the like may be installed on a front stage of the rectification part 10. Further, when the DC input voltage Vi is directly supplied to the isolated switching power supply 1, it may be possible to omit the rectification part 10.

The DC/DC conversion part 20 is a circuit block which generates the desired DC output voltage Vo from the DC input voltage Vi and supplies the DC output voltage Vo to the load 2. The DC/DC conversion part 20 includes a power supply IC 100, and various discrete parts (a transformer TR, resistors R1 to R8, capacitors C1 to C4, diodes D1 to D4, an N-channel metal oxide semiconductor (MOS) field effect transistor N1, a light emitting diode LED, a phototransistor PT, and a shunt regulator REG), which are externally mounted on the power supply IC 100.

The transformer TR includes a primary winding L1 (the number of turns Np) and a secondary winding L2 (the number of turns Ns), which are magnetically coupled with opposite polarities while electrically isolating the primary circuit system 1p and the secondary circuit system 1s from each other. In addition, the transformer TR includes an auxiliary winding L3 (the number of turns Nd) installed in the primary circuit system 1p, as a means for generating a power supply voltage Vcc of the power supply IC 100.

A first end of the primary winding L1 is connected to an application end of the DC input voltage Vi (=an output end of the diode bridge 12). A second end of the primary winding L1 is connected to a drain of the transistor N1. A first end of the secondary winding L2 is connected to an anode of the diode D4. A second end of the secondary winding L2 is connected to a ground terminal GND2 of the secondary circuit system 1s.

Further, the numbers of turns Np and Ns may be arbitrarily adjusted so as to obtain the desired DC output voltage Vo. For example, the DC output voltage Vo is lowered as the number of turns Np increases or the number of turns Ns decreases, and conversely, the DC output voltage Vo is raised as the number of turns Np decreases or the number of turns Ns increases.

The power supply IC 100 is a semiconductor integrated circuit device installed in the primary circuit system 1p, and corresponds to a power supply control device which is a main control unit of the isolated switching power supply 1 (specifically, the DC/DC conversion part 20). In addition, the power supply IC 100 includes external terminals T1 to T8 as means for establishing electrical connection with the outside of the device. It is understood that external terminals other than the foregoing terminals may be installed on the power supply IC 100.

The external terminal T1 (an auxiliary winding monitor/external latch stop terminal) is connected to a connection node (=an application end of a monitor voltage Vm) between the resistor R1 and the resistor R2. Further, the resistors R1 and R2 are connected in series between a first end (=an application end of an induced voltage Vp) and a second end (=the ground GND1 of the primary circuit system 1p) of the auxiliary winding L3. The resistors R1 and R2 connected in this manner function as a voltage division part that outputs the monitor voltage Vm (={R2/(R1+R2)}×Vp) corresponding to the induced voltage Vp of the auxiliary winding L3 from the connection node between them.

Here, in case that a voltage value of the induced voltage Vp during an ON period of the transistor N1 is Vpon and a voltage value of the induced voltage Vp during an OFF period of the transistor N1 is Vpoff, Vpon≈−Vi×(Nd/Np) and Vpoff≈Vo×(Nd/Ns).

That is, the voltage value Vpon varies depending on the DC input voltage Vi, and the voltage value Vpoff varies depending on the DC output voltage Vo. Therefore, for example, by monitoring the monitor voltage Vm corresponding to the induced voltage Vp during the OFF period of the transistor N1, it is possible to apply overvoltage protection of the DC output voltage Vo and to perform operation mode switching (details of which will be described later) depending on the DC output voltage Vo.

Thus, a group of the circuit elements (TR, and R1 to R2) described above function as a first output detection part that generates the monitor voltage Vm (=corresponding to a first output detection signal) corresponding to an absolute value of the DC output voltage Vo.

The external terminal T2 (=a feedback signal input terminal) is connected to a collector of the phototransistor PT and a first end of the capacitor C1. An emitter of the phototransistor PT and a second end of the capacitor C1 are both connected to the ground GND1. The phototransistor PT, which functions as a photocoupler together with the light emitting diode LED installed in the secondary circuit system 1s, generates a feedback current Ifb depending on an optical signal from the light emitting diode LED.

The external terminal T3 (=a primary current sense terminal) is connected to a source and a back gate of the transistor N1 and a first end of the resistor R3. A second end of the resistor R3 is connected to the ground GND1. The resistor R3 functions as a sense resistor that detects a primary current Ip flowing through the transistor N1 as a sense voltage Vcs (=Ip×R3).

The external terminal T4 (=a ground terminal) is connected to the ground GND1.

The external terminal T5 (=an external MOS drive terminal) is connected to a gate of the transistor N1 and externally outputs a gate signal G1. The transistor N1 is an output switch for turning on and off the primary current Ip flowing through the primary winding L1 by conducting and blocking a current path from the application end of the DC input voltage Vi to the ground terminal GND1 via the primary winding L1. Further, the transistor N1 is turned on when the gate signal G1 is at a high level, and is turned off when the gate signal G1 is at a low level.

The external terminal T6 (=a power supply terminal) is connected to a connection node (=an application end of the power supply voltage Vcc) between a cathode of the diode D1 and a first end of a capacitor C2. An anode of the diode D1 is connected to the first end of the auxiliary winding L3. A second end of the capacitor C2 is connected to the ground GND1. The diode D1 and the capacitor C2 connected in this manner function as a power supply voltage generation part that generates the power supply voltage Vcc of the power supply IC 100 by rectifying and smoothing the induced voltage Vp generated in the auxiliary winding L3. A winding ratio of the primary winding L1 to the auxiliary winding L3 of the transformer TR may be appropriately set in consideration of the power supply voltage Vcc required for the power supply IC 100.

The external terminal T7 (a non-connect terminal) is not connected anywhere.

The external terminal T8 (=a driving/AC input voltage monitor terminal) is connected to a first end of a resistor R4 (=an application end of a high voltage VH). A second end of the resistor R4 is connected to respective cathodes of diodes D2 and D3. Anodes of the diodes D2 and D3 are connected to positive and negative input ends of the diode bridge 12 (=application ends of the AC input voltage Vac), respectively.

Next, connection relationships between the circuit elements installed in the secondary circuit system 1s will be described.

The anode of the diode D4 is connected to the first end of the secondary winding L2 as described above. A cathode of the diode D4 and a first end of the capacitor C3 are both connected to an output end of the DC output voltage Vo. A second end of the capacitor C3 is connected to the ground GND2. The diode D4 and the capacitor C3 connected in this manner function as a rectifying and smoothing part that rectifies and smooths an induced voltage Vs generated in the secondary winding L2 to generate the DC output voltage Vo.

A first end of a resistor R5 is connected to the output end of the DC output voltage Vo. A second end of the resistor R5 is connected to an anode of the light emitting diode LED. A cathode of the light emitting diode LED is connected to a cathode of the shunt regulator REG. An anode of the shunt regulator REG is connected to the ground. A gate of the shunt regulator REG (=corresponding to a control terminal) is connected to a connection node (=application end of a divided voltage Vod, where Vod={R8/(R7+R8)}×Vo)) between the resistors R7 and R8 connected in series between the output end of the DC output voltage Vo and the ground GND2. The resistor R6 and the capacitor C4 are connected in series between the gate and the cathode of the shunt regulator REG.

The shunt regulator REG controls a drive current ILED of the light emitting diode LED such that the divided voltage Vod applied to its gate and a predetermined internal reference voltage VoREF are imaginarily short-circuited.

More specifically, when Vod>VoREF, as the difference value (=|Vod−VoREF|) therebetween becomes larger, the current ILED increases. As a result, since the light emission of the light emitting diode LED becomes strong, the feedback current Ifb flowing through the phototransistor PT is increased. On the other hand, when Vod<VoREF, as the difference value (=|Vod−VoREF therebetween becomes larger, the drive current ILED decreases. As a result, since the light emission of the light emitting diode LED becomes weakened, the feedback current Ifb flowing through the phototransistor PT is decreased.

That is, a group of circuit elements (R5 to R8, C4, LED, REG, and PT) described above function as a second output detection part that generates the feedback current Ifb (=corresponding to a second output detection signal) corresponding to a difference value between the DC output voltage Vo and a target value (={(R7+R8)/R8}×VoREF).

In addition, the isolated switching power supply 1 of this configuration example incorporates a function of variably controlling the DC output voltage Vo according to the operation state of the electronic device X. By incorporating such a function, it is possible to realize low standby power consumption of the electronic device X.

Further, the power supply IC 100 installed in the primary circuit system 1p does not have a function of setting the target value of the DC output voltage Vo. Thus, the variable control of the DC output voltage Vo is performed in the secondary circuit system 1s. In this drawing, although a configuration is illustrated such that the DC output voltage Vo is variably controlled by switching a voltage division ratio of the divided voltage Vod by adjusting the resistance value of the resistor R8 using a microcomputer, the variable control method of the DC output voltage Vo may not be limited thereto.

In the DC/DC conversion part 20 having the aforementioned configuration, the transistor N1, the transformer TR, the diode D4, and the capacitor C3 function as a step-down switching output stage of a flyback type, which generates the DC output voltage Vo from the DC input voltage Vi.

A step-down operation of the switching output stage will be briefly described. When the transistor N1 is turned on, the primary current Ip flows from the application end of the DC input voltage Vi to the ground GND1 via the primary winding L1, the transistor N1, and the resistor R3 so that electric energy is accumulated in the primary winding L1.

Thereafter, when the transistor N1 is turned off, the induced voltage Vs is generated in the secondary winding L2 magnetically coupled to the primary winding L1 to allow a secondary current Is to flow from the secondary winding L2 to the ground GND2 via the diode D4. At this time, the DC output voltage Vo obtained by rectifying and smoothing the induced voltage Vs of the secondary winding L2 is supplied to the load 2.

Even thereafter, as the transistor N1 is turned on and off, the same switching operation as above is repeated.

As described above, according to the isolated switching power supply 1 of this configuration example, it is possible to generate the DC output voltage Vo from the AC input voltage Vac and supply the DC output voltage Vo to the load 2 while electrically isolating the primary circuit system 1p and the secondary circuit system 1s.

<Power Supply IC>

Figure 2:
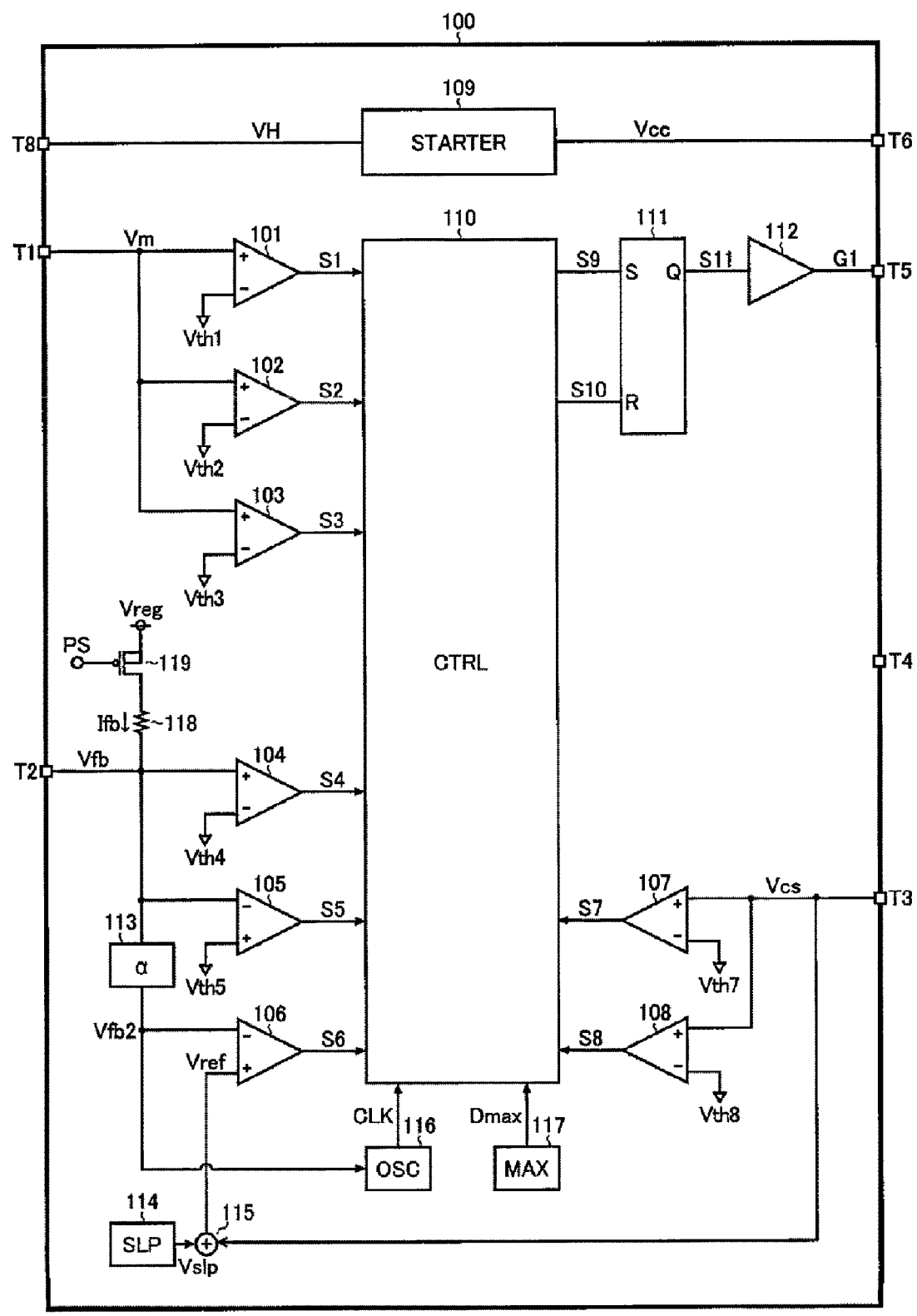
FIG. 2 is a diagram illustrating a configuration example of a power supply IC.

FIG. 2 is a diagram illustrating a configuration example of the power supply IC 100. In the power supply IC 100 of this configuration example, comparators 101 to 108, a starter 109, a controller 110, an RS flip-flop 111, a driver 112, a gain adjustment part 113, a slope compensation part 114, an addition part 115, an oscillator 116, a maximum duty setting part 117, a resistor 118, and a P-channel MOS field effect transistor 119 are integrated.

The comparator 101 compares the monitor voltage Vm, which is input from the external terminal T1 to its non-inverting input terminal (+), with a threshold voltage Vth1 (=corresponding to an overvoltage detection value) input to its inverting input terminal (−) to generate an overvoltage detection signal S1. The overvoltage detection signal S1 becomes a high level when Vm>Vth1, and becomes a low level when Vm<Vth1.

The comparator 102 compares the monitor voltage Vm, which is input from the external terminal T1 to its non-inverting input terminal (+), with a threshold voltage Vth2 (<Vth1, corresponding to a light-load detection value) input to its inverting input terminal (−) to generate a light-load detection signal S2. The light-load detection signal S2 becomes a high level when Vm>Vth2, and becomes a low level when Vm<Vth2.

The comparator 103 compares the monitor voltage Vm, which is input from the external terminal T1 to its non-inverting input terminal (+), with a threshold voltage Vth3 (<Vth2, corresponding to a no-load detection value) input to its inverting input terminal (−) to generate a no-load detection signal S3. The no-load detection signal S3 becomes a high level when Vm>Vth3, and becomes a low level when Vm<Vth3.

The comparator 104 compares the feedback voltage Vfb, which is input from the external terminal T2 to its non-inverting input terminal (+), with a threshold voltage Vth4 (=corresponding to an immediate return detection value) input to its inverting input terminal (−) to generate an immediate return detection signal S4. The immediate return detection signal S4 becomes a high level when Vfb>Vth4, and becomes a low level when Vfb<Vth4.

The comparator 105 compares the feedback voltage Vfb, which is input from the external terminal T2 to its inverting input terminal (−), with a threshold voltage Vth5 (<Vth4, corresponding to a burst detection value) input to its non-inverting input terminal (+) to generate a burst detection signal S5. Therefore, the burst detection signal S5 becomes a high level when Vfb<Vth5, and becomes a low level when Vfb>Vth5.

The comparator 106 compares a reference voltage Vref, which is input from the addition part 115 to its non-inverting input terminal (+), with a divided feedback voltage Vfb2 (=α×Vfb, where 0<α<1) input to its inverting input terminal (−) to generate an OFF timing signal S6. The OFF timing signal S6 becomes a high level when Vref>Vfb2, and becomes a low level when Vref<Vfb2.

The comparator 107 compares the sense voltage Vcs, which is input from the external terminal T3 to its non-inverting input terminal (+), with a threshold voltage Vth7

(=corresponding to an overload detection value) input to its inverting input terminal (−) to generate an overload detection signal S7. The overload detection signal S7 becomes a high level when Vcs>Vth7, and becomes a low level when Vcs<Vth7.

The comparator 108 compares the sense voltage Vcs, which is input from the external terminal T3 to its non-inverting input terminal (+), with a threshold voltage Vth8 (=corresponding to an overcurrent detection value) input to its inverting input terminal (−) to generate an overcurrent detection signal S8. The overcurrent detection signal S8 becomes a high level when Vcs>Vth8, and becomes a low level when Vcs<Vth8.

Further, although not clearly illustrated in this drawing, a mask processing part for fixing the sense voltage Vcs to a zero value over a predetermined mask period after turning on the output switch N1 may be installed on a front stage of the comparators 107 and 108. With this configuration, it is not affected by a ringing noise of the sense voltage Vcs generated when the transistor N1 is turned on.

When the power supply voltage Vcc falls below a predetermined threshold voltage immediately after the driving of the isolated switching power supply 1 or in a light-load mode or a no-load mode of the power supply IC 100 (details of which will be described later), the starter 109 raises the power supply voltage Vcc by charging or recharging the capacitor C2 externally installed on the external terminal T6 using the high voltage VH of the external terminal T8.

The controller 110 globally controls the operations of the respective parts of the power supply IC 100. For example, when attention is paid to ON duty control of the transistor N1, the controller 110 generates pulses of a set signal S9 and a reset signal S10 based on a drive clock signal CLK (=corresponding to an ON timing signal) which is input from the oscillator 116, the OFF timing signal S6 which is input from the comparator 106, and a maximum duty setting signal Dmax which is input from the maximum duty setting part 117.

In addition, when attention is paid to an abnormality protection function of the power supply IC 100, the controller 110 fixes the reset signal S10 to a logic level of an off time so as to forcibly turn off the transistor N1 based on the overvoltage detection signal S1, the overload detection signal S7, and the overcurrent detection signal S8.

Further, when attention is paid to the operation mode switching function of the power supply IC 100 (details of which will be described later), the controller 110 switches a plurality of operation modes (=a normal mode and at least one power saving mode) having different power consumption based on the light-load detection signal S2, the no-load detection signal S3, and the immediate return detection signal S4.

In addition, the controller 110 also has a function of determining whether to perform the burst control (=intermittent control) of the transistor N1 based on the burst detection signal S5. More specifically, the controller 110 basically continues to turn off the transistor N1 while the burst detection signal S5 is at a high level.

The RS flip-flop 111 switches a logic level of a pulse width modulation (PWM) signal S11, which is output from its output terminal Q, based on the set signal S9 input to its set terminal S and the reset signal S10 input to its reset terminal R. Specifically, the RS flip-flop 111 sets the PWM signal S11 to a high level when the set signal S9 rises to a high level, and resets the PWM signal S11 to a low level when the reset signal S10 rises to a high level.

The driver 112, which receives the PWM signal S11, generates the gate signal G1 and outputs it to the external terminal T5. More specifically, the driver 112 outputs the gate signal G1 of a high level when the PWM signal S11 is at a high level, and outputs the gate signal G1 of a low level when the PWM signal S11 is at a low level.

The gain adjustment part 113 generates the divided feedback voltage Vfb2 (=α×Vfb) by dividing the feedback voltage Vfb, which is input from the external terminal T2, by a predetermined gain α (=a voltage division ratio α). Further, the gain adjustment part 113 has a function of switching the gain α according to the operation mode of the power supply IC 100 (details of which will be described later).

The slope compensation part 114 generates a slope voltage Vslp in a triangular waveform, a sawtooth waveform, or an n-th order slope waveform (e.g., n=2) in synchronization with the drive clock signal CLK.

The addition part 115 adds the sense voltage Vcs (=a voltage signal obtained by simulating a behavior of the primary current Ip), which is input from the external terminal T3, to the slope voltage Vslp, which is input from the slope compensation part 114, to thereby generate the reference voltage Vref. With this configuration, since the output feedback control of the current mode system is performed, it is possible to enhance the stability of the output feedback loop and to improve the transient response characteristics during load fluctuation. However, if the output feedback control of the voltage mode system is sufficient, it is possible to omit the addition part 115.

The oscillator 116 generates the drive clock signal CLK for the controller 110 and outputs the drive clock signal CLK to the controller 110. Further, the oscillator 116 may have a function of raising an oscillation frequency of the drive clock signal CLK only for a certain period of time at peak load (=when the load becomes heavier than in a steady state) by monitoring the divided feedback voltage Vfb2. With this function, it is possible to realize lower price of the transistor N1 and size reduction of the transformer TR.

The maximum duty setting part 117 generates the maximum duty setting signal Dmax for limiting the ON duty Don (=a ratio of the ON period Ton occupying in the switching cycle T) of the transistor N1 to a predetermined upper limit or less, and outputs the maximum duty setting signal Dmax to the controller 110.

The resistor 118 (resistance value: R118) is a current/voltage conversion device, which is connected between an application end of a constant voltage Vreg and the external terminal T2, and converts the feedback current Ifb flowing through the external terminal T2 into the feedback voltage Vfb (=Vreg−Ifb×R118). Therefore, the feedback voltage Vfb is lowered as the feedback current Ifb increases, and is raised as the feedback current Ifb decreases.

A source and a back gate of the transistor 119 are connected to the application end of the constant voltage Vreg. A drain of the transistor 119 is connected to one end of the resistor 118. A gate of the transistor 119 is connected to an input end of a power save signal PS. The transistor 119 connected in this manner conducts and blocks a current path through which the feedback current Ifb flows depending on the power save signal PS. More specifically, the transistor 119 is turned on when the power save signal PS is at a low level, and is turned off when the power save signal PS is at a high level.

Further, although not clearly illustrated in this drawing, a constant voltage generation circuit, a charge pump circuit, a brownout circuit, a soft start circuit, an AC input compensation circuit, a frequency hopping circuit, and various protection circuits (under voltage lock out (UVLO) circuit and the like), in addition to the aforementioned components, may be integrated in the power supply IC 100.

<On Duty Control>

Next, the ON duty control of the transistor N1 will be briefly described. As described above, when Vod>VoREF, the larger the difference value(=|Vod−VoREF|) therebetween, the greater the drive current ILED, so that the feedback current Ifb is also increased. When the feedback current Ifb is increased, the feedback voltage Vfb is lowered and the timing of crossing the reference voltage Vref becomes faster. Thus, the rising timing of the OFF timing signal S6 becomes faster and the rising timing of the reset signal S10 becomes faster. As a result, the falling timing of the PWM signal S11 (further the gate signal G1) becomes faster and the ON duty Don of the transistor N1 is reduced, and thus the DC output voltage Vo is lowered.

Conversely, when Vod<VoREF, since the greater the difference value (=|Vod−VoREF|) therebetween, the larger the drive current ILED, so that the feedback current Ifb is also decreased. When the feedback current Ifb is decreased, the feedback voltage Vfb is increased and the timing of crossing the reference voltage Vref is delayed. Thus, the rising timing of the OFF timing signal S6 is delayed and the rising timing of the reset signal S10 is delayed. As a result, the falling timing of the PWM signal S11 (further the gate signal G1) is delayed and the ON duty Don of the transistor N1 is increased, and thus the DC output voltage Vo is increased.

By such ON duty control, it is possible to maintain the DC output voltage Vo at the target value (={(R7+R8)/R8}× VoREF).

Further, the comparator 106, the controller 110, the RS flip-flop 111, the driver 112, the gain adjustment part 113, the slope compensation part 114, and the resistor 118, among various components integrated in the power supply IC 100, function as an ON duty control part that controls the ON duty Don of the transistor N1 based on the feedback current Ifb (=a second output detection signal).

<Operation Mode Switching>

Next, the operation mode switching of the power supply IC 100 will be described. As described above, the controller 110 has a function of switching a plurality of operation modes with different power consumption based on the light-load detection signal S2, the no-load detection signal S3, and the immediate return detection signal S4.

In the following description, as the plurality of operation modes, a case where a light-load mode MODE2 and a no-load mode MODE3 are included in addition to a normal mode MODE1, as an example, will be described. The light-load mode MODE2 is a first power saving mode with less power consumption than the normal mode MODE1, and the no-load mode MODE3 is a second power saving mode with less power consumption than the light-load mode MODE2 (details of each of which will be described later).

Figure 3:
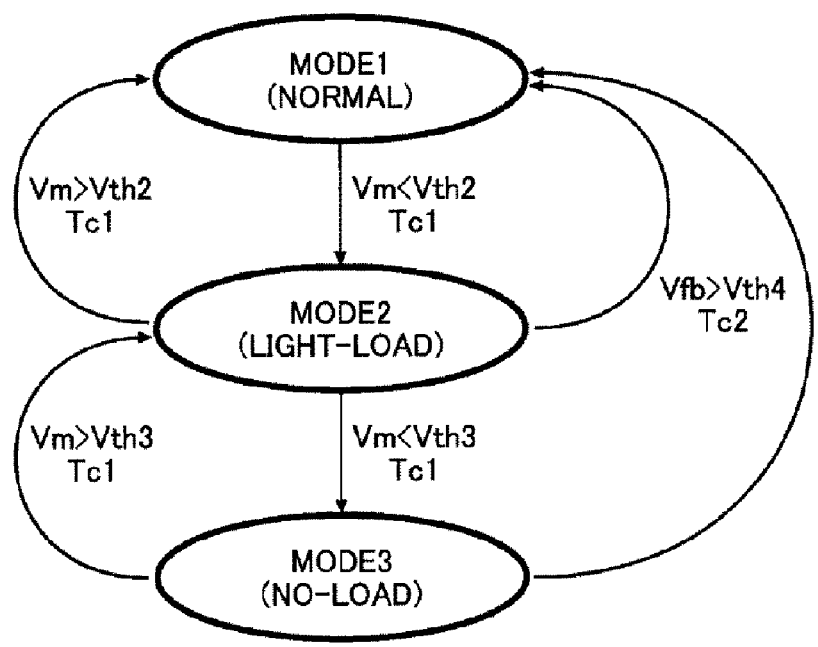
FIG. 3 is a diagram illustrating conditions of operation mode switching in the power supply IC.

FIG. 3 is a diagram illustrating conditions of operation mode switching in the power supply IC 100. When the power supply IC 100 is in the normal mode MODE1, if a state in which the monitor voltage Vm of the transistor N1 (more accurately, the monitor voltage Vm during an OFF period of the transistor N1, the same also applies below) is lower than the threshold voltage Vth2, namely a period during which the pulse edge of the light-load detection signal S2 is not detected, continues over a determination time Tc1, the power supply IC 100 transitions from the normal mode MODE1 to the light-load mode MODE2. Conversely, when the power supply IC 100 is in the light-load mode MODE2, if a state in which the monitor voltage Vm is higher than the threshold voltage Vth2, namely a period during which the pulse edge of the light-load detection signal S2 is periodically detected, continues over the determination time Tc1, the power supply IC 100 is returned from the light-load mode MODE2 to the normal mode MODE1.

Further, when the power supply IC 100 is in the light-load mode MODE2, if a state in which the monitor voltage Vm is lower than the threshold voltage Vth3, namely a period during which the pulse edge of the no-load detection signal S3 is not detected, continues over the determination time Tc1, the power supply IC 100 transitions from the light-load mode MODE2 to the no-load mode MODE3. Conversely, when the power supply IC 100 is in the no-load mode MODE3, if a state in which the monitor voltage Vm is higher than the threshold voltage Vth3, namely a period during which the pulse edge of the no-load detection signal S3 is periodically detected, continues over the determination time Tc1, the power supply IC 100 is returned from the no-load mode MODE3 to the light-load mode MODE2.

In this manner, the controller 110 switches the operation mode of the power supply IC 100 between the normal mode MODE1 and the light-load mode MODE2 or between the light-load mode MODE2 and the no-load mode MODE3 according to the monitoring result of the monitor voltage Vm (=the light-load detection signal S2 and the no-load detection signal S3).

As described above, the monitor voltage Vm during the OFF period of the transistor N1 varies depending on the DC output voltage Vo. Therefore, according to the switching of the operation mode described above, for example, when the DC output voltage Vo is lowered in the secondary circuit system 1s, it is also possible to lower the power consumption of the power supply IC 100 by detecting the lowering of the DC output voltage Vo. Thus, it is possible to realize lower standby power consumption of the entire electronic device X.

Further, in the power supply IC 100, since the monitor voltage Vm for overvoltage detection is also diverted for use in operation mode switching, it can be done without unnecessarily increasing the number of external terminals.

In addition, even when the power supply IC 100 is in either of the light-load mode MODE2 and the no-load mode MODE3, if a state in which the feedback voltage Vfb is higher than the threshold voltage Vth4, namely a state in which the immediate return detection signal S4 is at a high level, continues over a predetermined determination time Tc2, the power supply IC 100 is immediately returned to the normal mode MODE1.

The term "immediate return" herein refers to returning to the normal mode MODE1 without going through the light-load mode MODE2 even in the no-load mode MODE3 regardless of the monitoring result of the monitor voltage Vm, and includes not only immediately returning to the normal mode MODE1 at the timing that the immediate return detection signal S4 rises to a high level but also returning to the normal mode MODE1 through the predetermined determination time Tc2.

In this manner, the controller 110 is immediately returned to the normal mode MODE1 according to the monitoring result (=the immediate return detection signal S4) of the feedback current Ifb (furthermore the feedback voltage Vfb). Therefore, when the target value of the DC output voltage Vo is increased in the secondary circuit system 1s, it is possible that the power supply IC 100 returns to the normal mode MODE1 without delay and electric power supplied to the load 2 increases. Thus, it is possible to drive the DC output voltage Vo without any trouble even if the load 2 is heavy.

Figure 4:
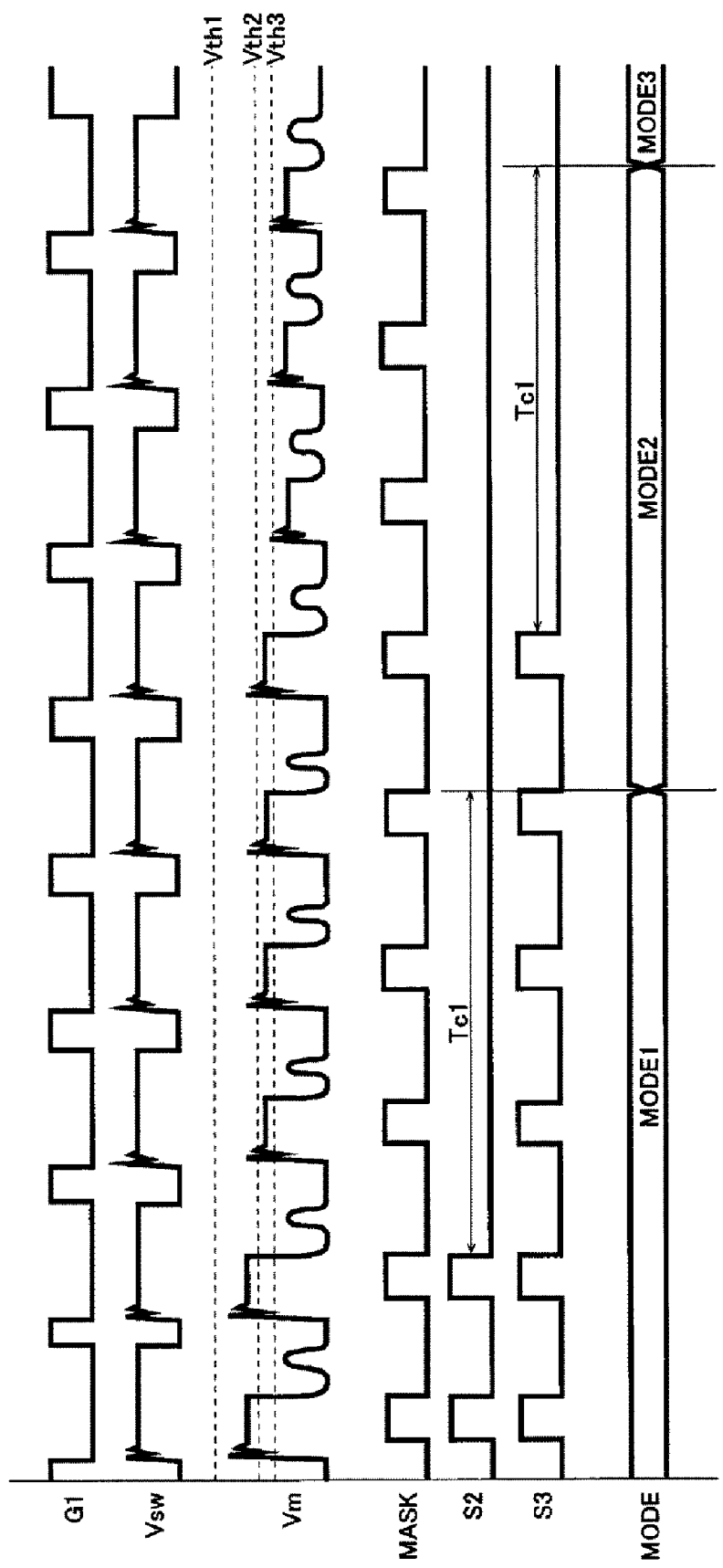
FIG. 4 is a timing diagram illustrating an example of operation mode switching in the power supply IC.

FIG. 4 is a timing diagram illustrating an example of operation mode switching in the power supply IC 100, in which from the top, the gate signal G1, a switch voltage Vsw (=a drain voltage of the transistor N1), the monitor voltage Vm, a mask signal MASK (=an internal signal of the controller 110), the light-load detection signal S2, the no-load detection signal S3, and the operation mode MODE of the power supply IC 100 are sequentially depicted.

The mask signal MASK is a binary signal for performing mask processing (=signal processing for extracting only the logic level during the OFF period of the transistor N1) on each of the light-load detection signal S2 and the no-load detection signal S3, and becomes a high level (=a logic level at the time of mask release) only for a predetermined monitoring period of time after the gate signal G1 falls to a low level. Therefore, in this drawing, the output signals of the comparators 102 and 103 are not depicted by themselves as the light-load detection signal S2 and the no-load detection signal S3, and the signals that have completed mask processing are depicted.

When the target value of the DC output voltage Vo is set to a normal value in the secondary circuit system 1s, it becomes that Vm>Vth2 during the OFF period of the transistor N1 (=a low level period of the gate signal G1). At this time, periodic pulses appear in the light-load detection signal S2 and the no-load detection signal S3, respectively. The controller 110 maintains the power supply IC 100 in the normal mode MODE1 while these pulses are detected.

On the other hand, when the target value of the DC output voltage Vo is lowered by one step in the secondary circuit system 1s, it becomes that Vth3<Vm<Vth2 during the OFF period of the transistor N1. At this time, periodic pulses appear in the no-load detection signal S3 as before, but the light-load detection signal S2 is stuck at a low level. When this state continues over the predetermined determination time Tc1, the controller 110 transitions the power supply IC 100 from the normal mode MODE1 to the light-load mode MODE2.

Further, when the target value of the DC output voltage Vo is lowered further by another step in the secondary circuit system 1s, it becomes that Vm<Vth3 during the OFF period of the transistor N1. At this time, not only the light-load detection signal S2 but also the no-load detection signal S3 is stuck at a low level. When this state continues over the predetermined determination time Tc1, the controller 110 transitions the power supply IC 100 from the light-load mode MODE2 to the no-load mode MODE3.

<Controller (First Configuration Example)>

Figure 5:
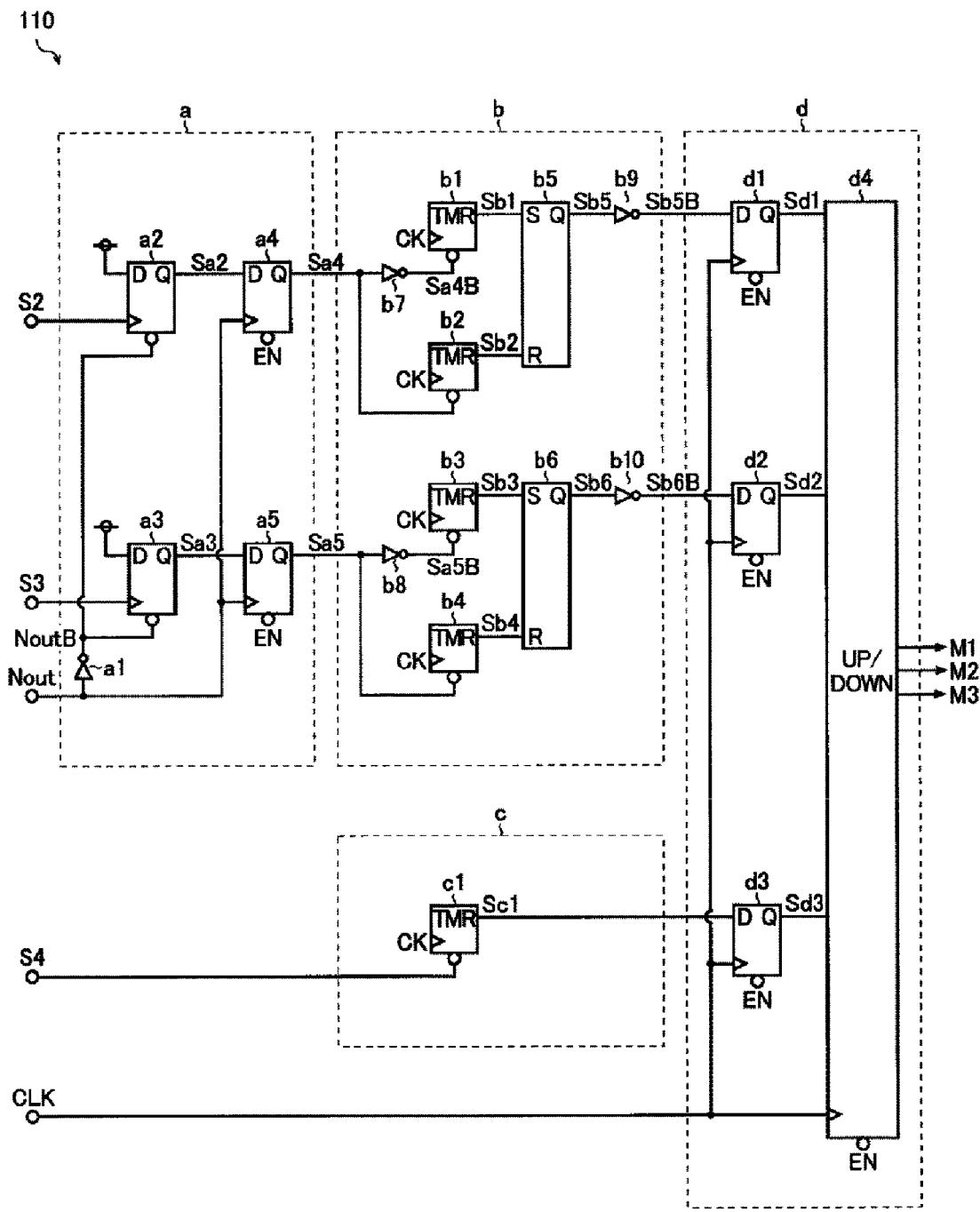
FIG. 5 is a diagram illustrating a first configuration example (a portion related to the operation mode switching) of a controller.

FIG. 5 is a diagram illustrating a first configuration example of the controller 110. The controller 110 of this configuration example includes an edge detection part a, a first timer part b, a second timer part c, and an operation mode switching part d as functional blocks related to the operation mode switching of the power supply IC 100.

The edge detection part a is a circuit block that detects respective pulse edges (e.g., rising edges) of the light-load detection signal S2 and the no-load detection signal S3, and includes an inverter a1 and D flip-flops a2 to a5.

The inverter a1 logically inverts an output state signal Nout to generate an inverted output state signal NoutB. Therefore, the inverted output state signal NoutB becomes a low level when the output state signal Nout is at a high level, and becomes a high level when the output state signal Nout is at a low level. The output state signal Nout is a signal indicative of an ON/OFF state of the transistor N1, for example, it becomes a high level during the ON period of the transistor N1 and becomes a low level during the OFF period of the transistor N1. The output state signal Nout may also be generated, for example, by level-shifting the gate signal G1.

The D flip-flop a2 latches a high level signal input to its data input terminal D when the light-load detection signal S2 input to its clock input terminal rises to a high level, and outputs the result as an edge detection signal Sa2 from its output terminal Q.

The D flip-flop a3 latches a high level signal input to its data input terminal D when the no-load detection signal S3 input to its clock input terminal rises to a high level, and outputs the result as a detection signal Sa3 from its output terminal Q.

Further, the D flip-flops a2 and a3 are reset by the inverted output state signal NoutB input to their respective reset input terminals. Specifically, the D flip-flops a2 and a3 are in a reset state (Sa2=Sa3=L) during a low level period of the inverted output state signal NoutB (=the ON period of the transistor N1), and are in a reset release state during a high level period of the inverted output state signal NoutB (=the OFF period of the transistor N1).

The D flip-flop a4 latches the edge detection signal Sa2 input to its data input terminal D when the output state signal Nout input to its clock input terminal rises to a high level, and outputs the result as an edge detection signal Sa4 from its output terminal Q.

The D flip-flop a5 latches the edge detection signal Sa3 input to its data input terminal D when the output state signal Nout input to its clock input terminal rises to a high level, and outputs the result as an edge detection signal Sa5 from its output terminal Q.

Further, the D flip-flops a4 and a5 are reset by an enable signal EN input to their respective reset input terminals. Specifically, the D flip-flops a4 and a5 are in a reset state (Sa4=Sa5=L) during a low level period of the enable signal EN (=a disable period of the power supply IC 100), and are in a reset release state during a high level period of the enable signal EN (=an enable period of the power supply IC 100).

The first timer part b is a circuit block that counts the predetermined determination time Tc1, and includes timers b1 to b4, RS flip-flops b5 and b6, and inverters b7 to b10.

The timer b1 is for determining the transition from the normal mode MODE1 to the light-load mode MODE2, counts the number of pulses of a clock pulse CK input to its clock input terminal, and raises a set signal Sb1 to a high level when the count value reaches a predetermined value (=corresponding to the determination time Tc1). However, the timer b1 is reset by an inverted edge detection signal Sa4B input to its reset input terminal. More specifically, the timer b1 is in a reset state during a low level period of the inverted edge detection signal Sa4B (=a period during which the pulse edge of the light-load detection signal S2 is periodically detected), and is in a reset release state during a high level period of the inverted edge detection signal Sa4B (=a period during which the pulse edge of the light-load detection signal S2 is not detected). Therefore, the set signal Sb1 rises to a high level when the inverted edge detection signal Sa4B is maintained at a high level over the determination time Tc1.

The timer b2 is for determining the returning from the light-load mode MODE2 to the normal mode MODE1, counts the number of pulses of the clock pulse CK input to its clock input terminal, and raises a reset signal Sb2 to a high level when the count value reaches a predetermined value (=corresponding to the determination time Tc1). However, the timer b2 is reset by the edge detection signal Sa4 input to its reset input terminal. Specifically, the timer b2 is in a reset state during a low level period of the edge detection signal Sa4 (=a period during which the pulse edge of the light-load detection signal S2 is not detected), and is in a reset release state during a high level period of the edge detection signal Sa4 (=a period during which the pulse edge of the light-load detection signal S2 is periodically detected).

Therefore, the reset signal Sb2 rises to a high level when the edge detection signal Sa4 is maintained at a high level over the determination time Tc1.

The timer b3 is for determining the transition from the light-load mode MODE2 to the no-load mode MODE3, counts the number of pulses of the clock pulse CK input to its clock input terminal, and raises a set signal Sb3 to a high level when the count value reaches a predetermined value (=corresponding to the determination time Tc1). However, the timer b3 is reset by an inverted edge detection signal Sa5B input to its reset input terminal. More specifically, the timer b3 is in a reset state during a low level period of the inverted edge detection signal Sa5B (=a period during which the pulse edge of the no-load detection signal S3 is periodically detected), and is in a reset release state during a high level period of the inverted edge detection signal Sa5B (=a period during which the pulse edge of the no-load detection signal S3 is not detected). Therefore, the set signal Sb3 rises to a high level when the inverted edge detection signal Sa5B is maintained at a high level over the determination time Tc1.

The timer b4 is for determining the returning from the no-load mode MODE3 to the light-load mode MODE2, counts the number of pulses of the clock pulse CK input to its clock input terminal, and raises a reset signal Sb4 to a high level when the count value reaches a predetermined value (=corresponding to the determination time Tc1). However, the timer b4 is reset by the edge detection signal Sa5 input to its reset input terminal. More specifically, the timer b4 is in a reset state during a low level period of the edge detection signal Sa5 (=a period during which the pulse edge of the no-load detection signal S3 is not detected), and is in a reset release state during a high level period of the edge detection signal Sa5 (=a period during which the pulse edge of the load detection signal S3 is periodically detected). Therefore, the reset signal Sb4 rises to a high level when the edge detection signal Sa5 is maintained at a high level over the determination time Tc1.

The RS flip-flop b5 switches a logic level of a transition return signal Sb5 to be output from its output terminal Q depending on the set signal Sb1 input to its set terminal S and the reset signal Sb2 input to its reset terminal R. Specifically, the RS flip-flop b5 sets the transition return signal Sb5 to a high level when the set signal Sb1 rises to a high level, and resets the transition return signal Sb5 to a low level when the reset signal Sb2 rises to a high level. That is, the transition return signal Sb5 rises to a high level at the timing that it is required to transition from the normal mode MODE1 to the light-load mode MODE2, and falls to a low level at the timing that it is required to return from the light-load mode MODE2 to the normal mode MODE1.

The RS flip-flop b6 switches a logic level of a transition return signal Sb6 to be output from its output terminal Q depending on the set signal Sb3 input to its set terminal S and the reset signal Sb4 input to its reset terminal R. More specifically, the RS flip-flop b6 sets the transition return signal Sb6 to a high level when the set signal Sb3 rises to a high level, and resets the transition return signal Sb6 to a low level when the reset signal Sb4 rises to a high level. That is, the transition restoration signal Sb6 rises to a high level at the timing that it is required to transition from the light-load mode MODE2 to the no-load mode MODE3, and falls to a low level at the timing that it is required to return from the no-load mode MODE3 to the light-load mode MODE2.

The inverter b7 logically inverts the edge detection signal Sa4 to generate the inverted edge detection signal Sa4B. Therefore, the inverted edge detection signal Sa4B becomes a low level when the edge detection signal Sa4 is at a high level, and becomes a high level when the edge detection signal Sa4 is at a low level.

The inverter b8 logically inverts the edge detection signal Sa5 to generate the inverted edge detection signal Sa5B. Therefore, the inverted edge detection signal Sa5B becomes a low level when the edge detection signal Sa5 is at a high level, and becomes a high level when the edge detection signal Sa5 is at a low level.

The inverter b9 logically inverts the transition return signal Sb5 to generate an inverted transition return signal Sb5B. The inverted transition return signal Sb5B becomes a low level when the transition return signal Sb5 is at a high level, and becomes a high level when the transition return signal Sb5 is at a low level.

The inverter b10 logically inverts the transition return signal Sb6 to generate an inverted transition return signal Sb6B. The inverted transition return signal Sb6B becomes a low level when the transition return signal Sb6 is at a high level, and becomes a high level when the transition return signal Sb6 is at a low level.

The second timer part c is a circuit block that counts the predetermined determination time Tc2, and includes a timer c1.

The timer c1 is for determining the immediate returning from the light-load mode MODE2 and the no-load mode MODE3 to the normal mode MODE1, counts the number of pulses of the clock pulse CK input to its clock input terminal, and raises an immediate return signal Sc1 to a high level when the count value reaches a predetermined value (=corresponding to the determination time Tc2). However, the timer c1 is reset by the immediate return detection signal S4 input to its reset input terminal. Specifically, the timer c1 is in a reset state during a low level period of the immediate return detection signal S4 (=a period during which the feedback voltage Vfb is lower than the threshold voltage Vth4), and is in a reset release state during a high level period (=a period during which the voltage Vfb is higher than the threshold voltage Vth4). Therefore, the immediate return signal Sc1 rises to a high level when the immediate return detection signal S4 is maintained at a high level over the determination time Tc.

Further, in this drawing, a configuration example using pulse counters (=digital timers) as the timers b1 to b4 and the timer c1, respectively, is illustrated, but analog timers may be used.

The operation mode switching part d is a circuit block that generates mode signals M1 to M3 based on the inverted transition return signals Sb5B and Sb6B and the immediate return signal Sc1, and includes D flip-flops d1 to d3 and an up/down counter d4.

The D flip-flop d1 latches the inverted transition return signal Sb5B input to its data input terminal D when the drive clock signal CLK input to its clock input terminal rises to a high level, and outputs the result as an up/down signal Sd1 from its output terminal Q.

The D flip-flop d2 latches the inverted transition return signal Sb6B input to its data input terminal D when the drive clock signal CLK input to its clock input terminal rises to a high level, and outputs the result as an up/down signal Sd2 from its output terminal Q.

The D flip-flop d3 latches the immediate return signal Sc1 input to its data input terminal D when the drive clock signal CLK input to its clock input terminal rises to a high level, and outputs the result as a reset signal Sd3 from its output terminal Q.

In addition, the D flip-flops d1 to d3 are reset by the enable signal EN input to their respective reset input terminals. More specifically, the D flip-flops d1 to d3 are in a reset state (Sd1=Sd2=Sd3=L) during a low level period of the enable signal EN (=a disable period of the power supply IC 100), and are in a reset release state during a high level of the enable signal EN (=an enable period of the power supply IC 100).

The up/down counter d4 switches the logic levels of the mode signals M1 to M3 upon occurrence of the rising edge and the falling edge of the up/down signals Sd1 and Sd2.

Further, as a premise of the following description, it is assumed that the mode signal M1 becomes a high level when the power supply IC 100 is in the normal mode MODE1, and becomes a low level when it is in other operation modes. On the other hand, it is assumed that the mode signal M2 becomes a high level when the power supply IC 100 is in the light-load mode MODE2, and becomes a low level when it is in other operation modes. Further, it is assumed that the mode signal M3 becomes a high level when the power supply IC 100 is in the no-load mode MODE3, and becomes a low level when it is in other operation modes.

That is, when the mode signals M1 to M3 are understood as a 3-bit signal of "M1M2M3," an output value of the up/down counter d4 may take three values "100b," "010b," and "001b," and the respective output values correspond to the normal mode MODE1, the light-load mode MODE2, and the no-load mode MODE3.

For example, when the output value of the up/down counter d4 is "100b," if the pulse edge of the light-load detection signal S2 is not detected over the determination time Tc1 and the up/down signal Sd1 falls to a low level, the output value of the up/down counter d4 is counted down to "010b." By this count-down, the operation mode of the power supply IC 100 is transitioned from the normal mode MODE1 to the light-load mode MODE2.

On the other hand, when the output value of the up/down counter d4 is "010b," if the pulse edge of the light-load detection signal S2 is periodically detected over the determination time Tc1 and the up/down signal Sd1 rises to a high level, the output value of the up/down counter d4 is counted up to "100b." By this count-up, the operation mode of the power supply IC 100 is returned from the light-load mode MODE2 to the normal mode MODE1.

Further, for example, when the output value of the up/down counter d4 is "010b," if the pulse edge of the no-load detection signal S3 is not detected over the determination time Tc1 and the up/down signal Sd2 falls to a low level, the output value of the up/down counter d4 is counted down to "001b." By this count-down, the operation mode of the power supply IC 100 is transitioned from the light-load mode MODE2 to the no-load mode MODE3.

On the other hand, when the output value of the up/down counter d4 is "001b," if the pulse edge of the no-load detection signal S3 is periodically detected over the determination time Tc1 and the up/down signal Sd2 rises to a high level, the output value of the up/down counter d4 is counted up to "010b." By this count-up, the operation mode of the power supply IC 100 is returned from the no-load mode MODE3 to the light-load mode MODE2.

Further, the up/down counter d4 is reset by the reset signal Sd3 input from the D flip-flop d3. More specifically, when the output value of the up/down counter d4 is "010b" or "001b," if the feedback voltage Vfb continually exceeds the threshold voltage Vth4 over the determination time Tc2 and the reset signal Sd3 rises to a high level, the output value of the up/down counter d4 is reset to "100b." By this reset, the operation mode of the power supply IC 100 is immediately returned from the light-load mode MODE2 or the no-load mode MODE3 to the normal mode MODE1.

Further, the up/down counter d4 is reset by the enable signal EN input to its reset input terminal. More specifically, the up/down counter d4 is in a reset state during a low level period of the enable signal EN (=a disable period of the power supply IC 100), and is in a reset release state during a high level period of the enable signal EN (=an enable period of the power supply IC 100).

<Light-Load Mode>

Figure 6:
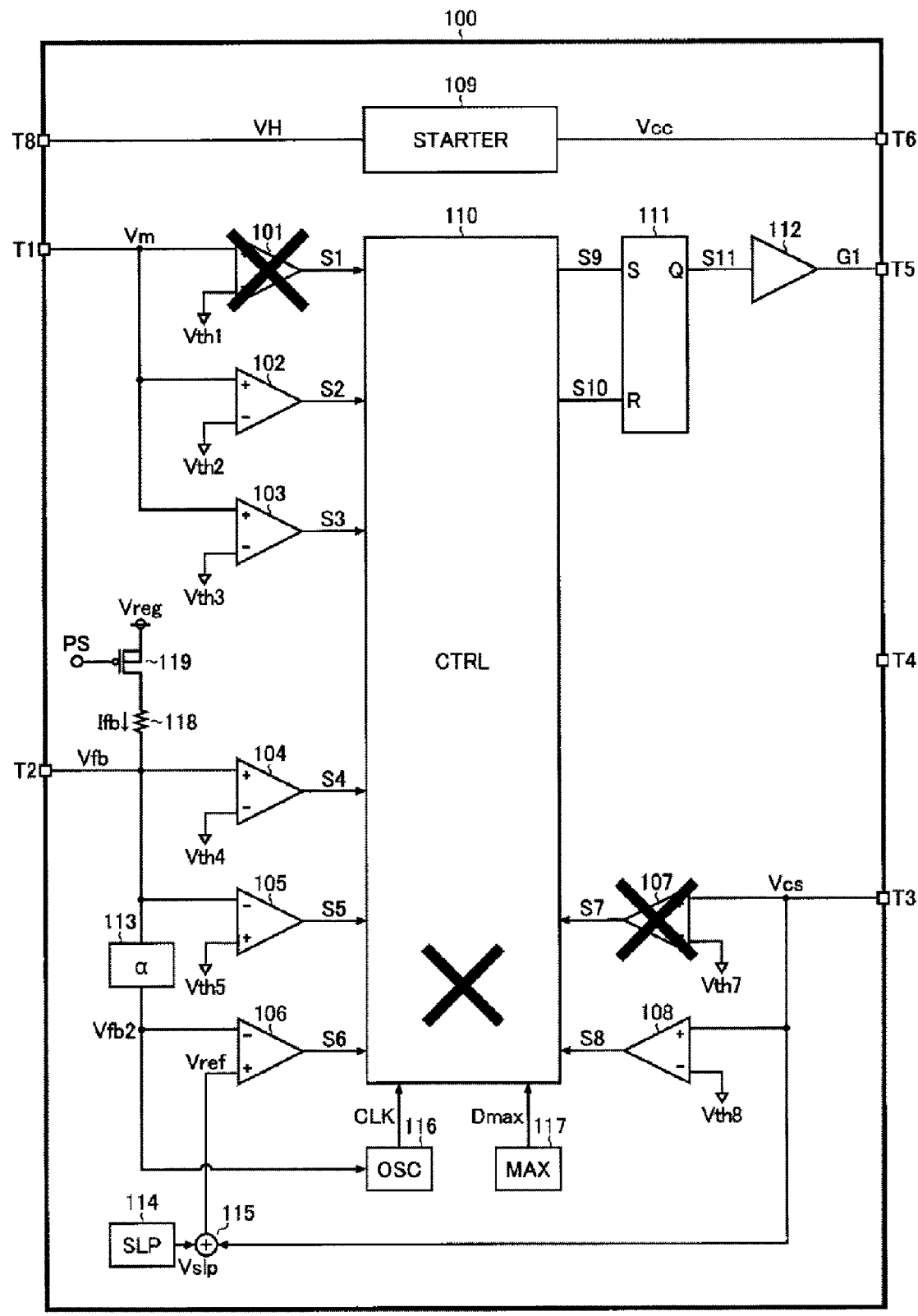
FIG. 6 is a diagram illustrating an internal operation state of the power supply IC in a light-load mode.

FIG. 6 is a diagram illustrating an internal operation state of the power supply IC 100 in the light-load mode MODE2. As indicated by symbol X in this drawing, in the light-load mode MODE2, the operations of the comparators 101 and 107 and a part of the controller 110 (=functional parts related to the signal processing of the overvoltage detection signal S1 and the overload detection signal S7) are stopped, and their respective current consumption is reduced.

Figure 7:
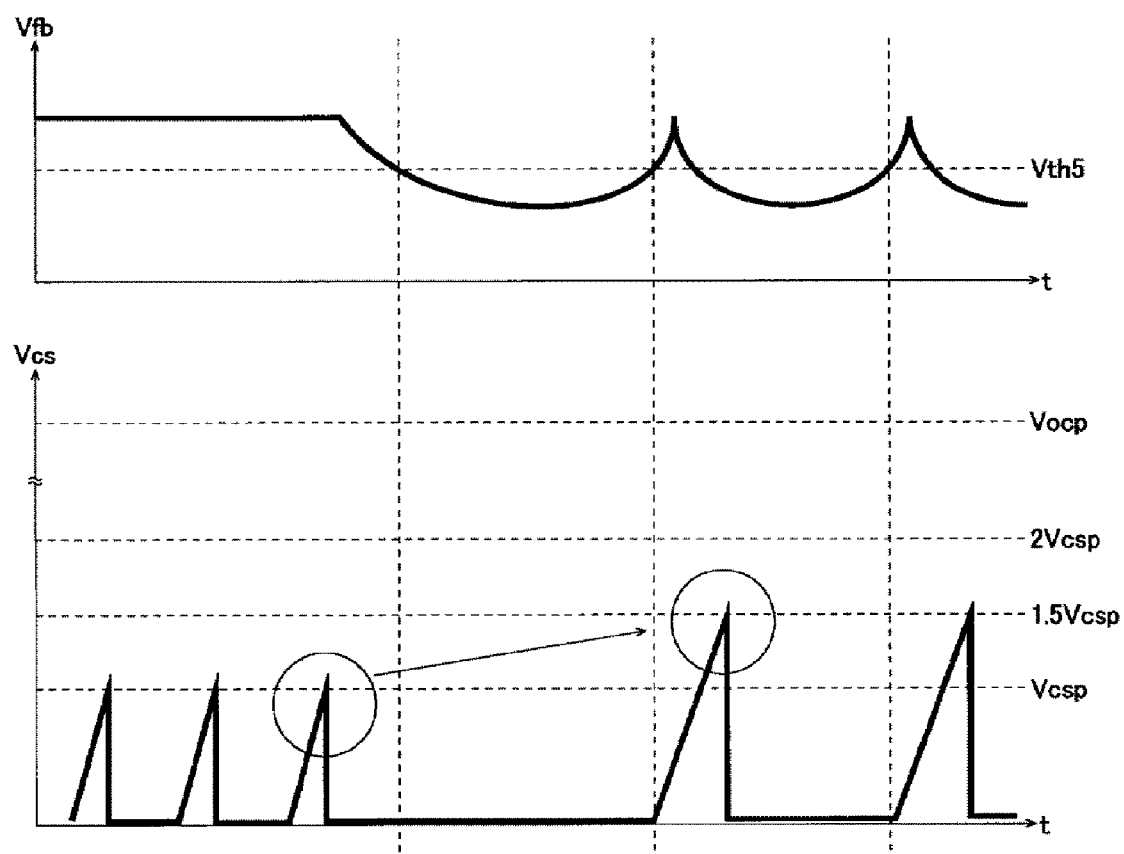
FIG. 7 is a timing diagram illustrating an example of peak current control in the light-load mode.

FIG. 7 is a timing diagram illustrating an example of a peak current control in the light-load mode MODE2. Further, the feedback voltage Vfb is depicted at the top and the sense voltage Vcs is depicted at the bottom.

As illustrated in the drawing, in the light-load mode MODE2, the peak current value of the primary current Ip flowing through the transistor N1 (=the peak value Vcsp of the sense voltage Vcs) is, for example, 1.5 times larger than the peak current value of the normal mode MODE1.

According to this peak current control, it is possible to allow more primary current Ip to flow by turning on the transistor N1 only once. Therefore, for example, as illustrated in this drawing, in the case where the feedback voltage Vfb falls below the threshold voltage Vth5 and the burst control of the transistor N1 is performed, the number of times of switching at the time of burst release can be reduced, and thus it is possible to reduce the switching loss.

As described above, in the light-load mode MODE2, the current consumption of the power supply IC 100 is reduced more than in the normal mode MODE1 and the peak current value at the time of burst release is increased, such that low standby power consumption of the power supply IC 100 can be realized.

<No-Load Mode>

Figure 8:
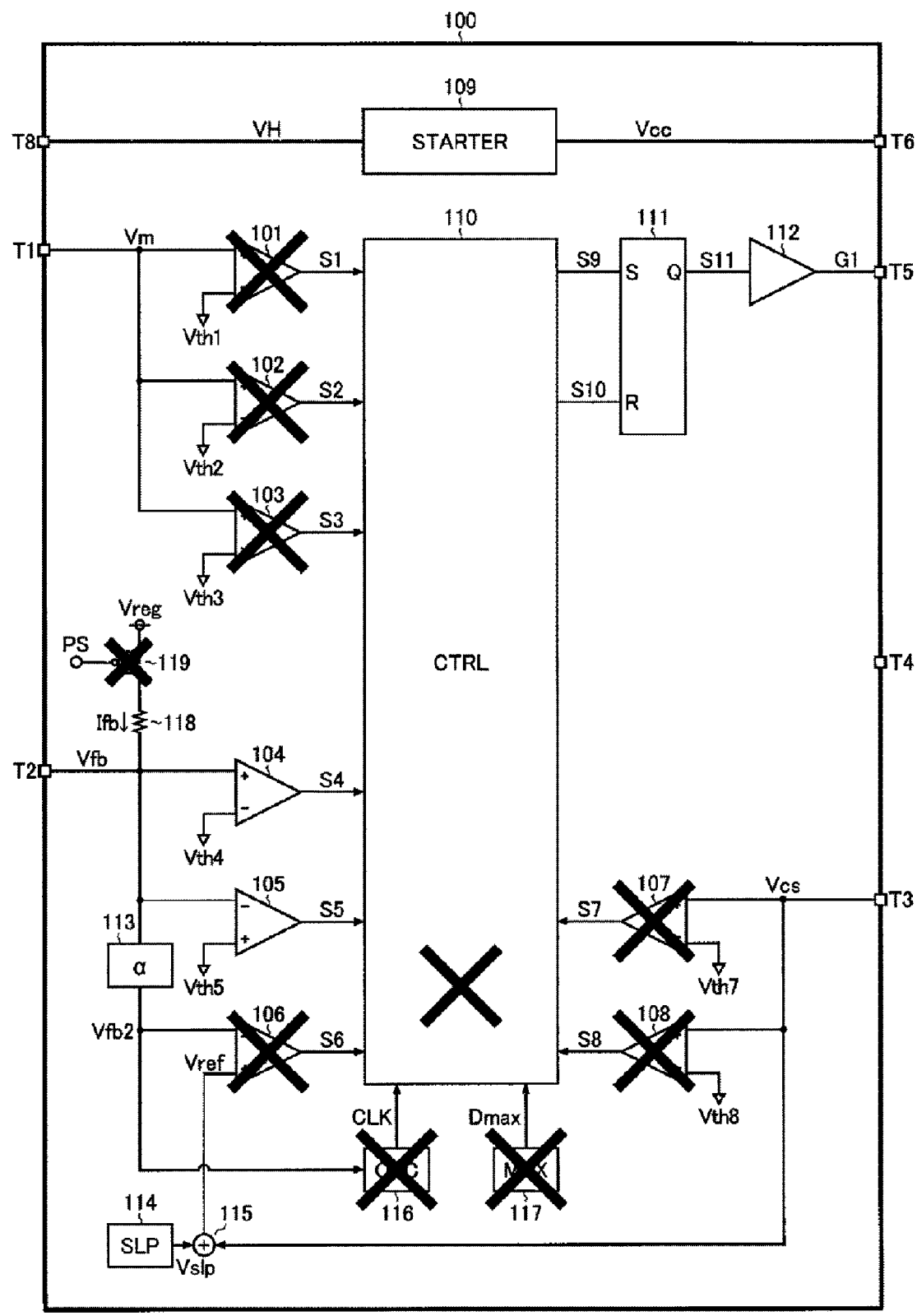
FIG. 8 is a diagram illustrating an internal operation state of the power supply IC in a no-load mode.

FIG. 8 is a diagram illustrating an internal operation state of the power supply IC 100 in the no-load mode MODE3. As indicated by symbol X in this drawing, in the no-load mode MODE3, the current consumption is reduced in the same manner as in the light-load mode (MODE2) described above, and further, during the burst stop period of the transistor N1, the operations of the comparators 101 to 103, the comparators 106 to 108, the oscillator 116, the maximum duty setting part 117, and almost all parts of the controller 110 (except for the functional parts related to the signal processing of the immediate return detection signal S4 and the burst detection signal S5) are stopped, and the respective current consumption is reduced.

Further, in the no-load mode MODE3, the transistor 119 is turned off during the burst stop period of the transistor N1. Therefore, since the current path through which the feedback current Ifb flows is blocked, the current consumption of the power supply IC 100 is greatly reduced.

Figure 9:
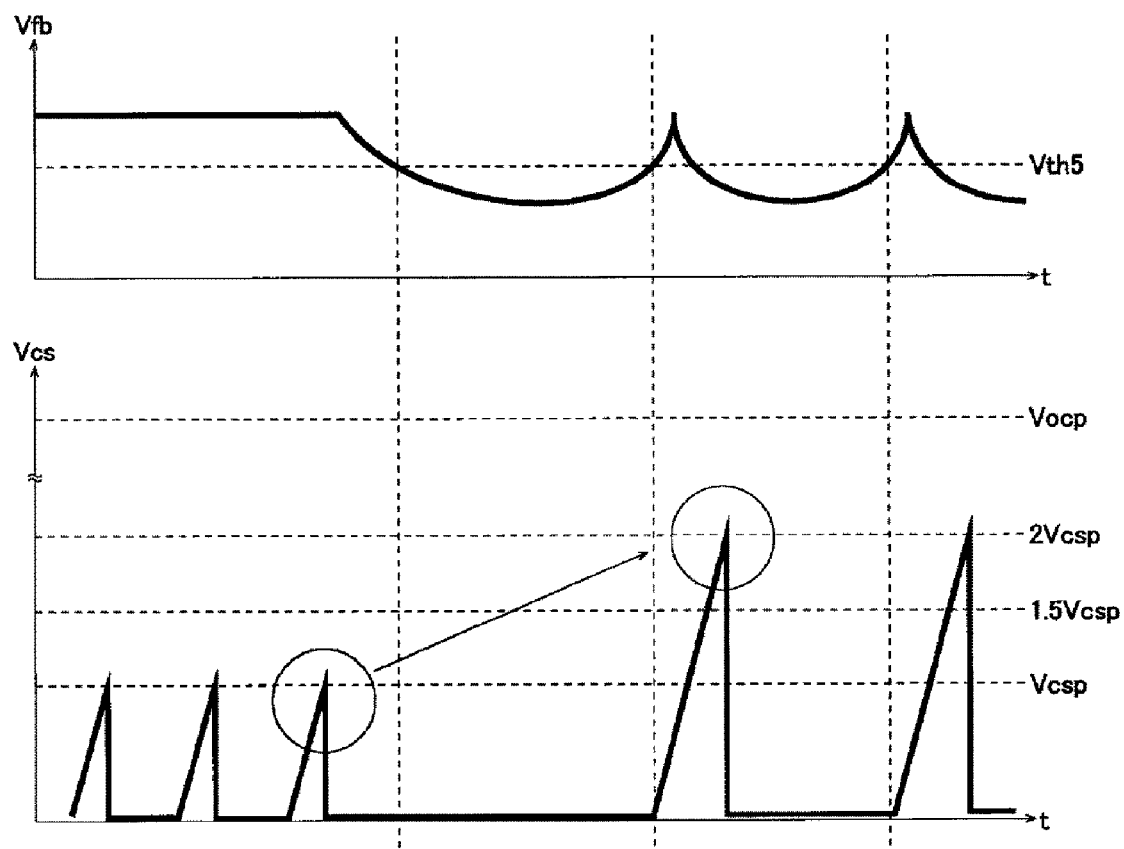
FIG. 9 is a timing diagram illustrating an example of peak current control in the no-load mode.

FIG. 9 is a timing diagram illustrating an example of peak current control in the no-load mode MODE3. Further, as in previous FIG. 7, the feedback voltage Vfb is depicted in the upper stage and the sense voltage Vcs is depicted in the lower stage.

As illustrated in the drawing, in the no-load mode MODE3, the peak current value of the primary current Ip flowing through the transistor N1 (=the peak value Vcsp of the sense voltage Vcs) is increased, for example, twice the peak current value of the normal mode MODE1. Therefore, since the number of times of switching at the time of burst release can be reduced more than in the light-load mode MODE2, it is possible to further reduce the switching loss.

In addition, although the peak current value of the primary current Ip is doubled, the peak value (=2 Vcsp) of the sense voltage Vcs is set sufficiently lower than the overcurrent detection value Vocp. Therefore, unintentional overcurrent protection is not applied in the no-load mode (MODE3).

Further, in the no-load mode MODE3, a burst stop time is controlled to be always equal to or larger than a predetermined value (e.g., 10 ms) (details of which will be described later).

As described above, in the no-load mode MODE3, the burst stop time is controlled to be equal to or larger than the predetermined value, and the consumption current at the time of burst stop is reduced more than in the light-load mode MODE2 and the peak current value at the time of burst release is further raised, such that lower standby power consumption of the power supply IC 100 can be realized.

<Controller (Second Configuration Example)>

Figure 10:
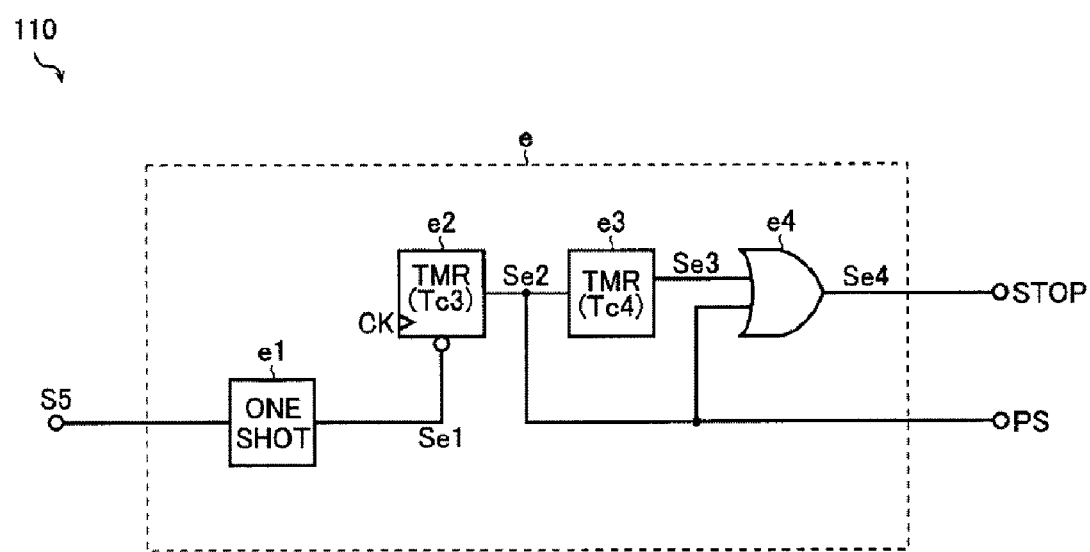
FIG. 10 is a diagram illustrating a second configuration example (a portion related to the burst control) of the controller.

FIG. 10 is a diagram illustrating a second configuration example of the controller 110. The controller 110 of this configuration example includes a burst control part e as a functional block related to the burst control of the no-load mode MODE3.

The burst control part e is a circuit block that generates a burst stop signal STOP and a power save signal PS such that the burst stop time is always equal to or larger than a predetermined value (e.g., 10 ms) in the no-load mode MODE3, and includes a one-shot pulse generation part e1, timers e2 and e3, and an OR operator e4.

The one-shot pulse generation part e1 generates a one-shot pulse in a reset signal Se1 when the burst detection signal S5 rises to a high level.

The timer e2 is for measuring a burst stop time Tc3 (e.g., 10 ms), counts the number of pulses of the clock pulse CK input to its clock input terminal, and makes a timer signal Se2 to fall from a high level to a low level when the count value reaches a predetermined value (=corresponding to the burst stop time Tc3). Further, the timer e2 is reset by the one-shot pulse of the reset signal Se1 input to its reset input terminal. Therefore, the timer signal Se2 rises to a high level at the timing that the burst detection signal S5 rises to a high level, and falls to a low level at the timing that the burst stop time Tc3 has elapsed. Further, the timer signal Se2 is output to the timer e3, and also output to each part of the power supply IC 100 as the power save signal PS.

The timer e3 is for generating a circuit recovery time Tc4 (e.g., 150 μs), and it may use, as the simplest circuit configuration, for example, a delay timer that generates a delayed timer signal Se3 by delaying the timer signal Se2 by the circuit recovery time Tc4. The circuit recovery time Tc4 refers to a required standby time taken from the resumption of current supply to each part of the power supply IC 100 until the stabilization of the operation of each part.

The OR operator e4 generates a logical sum signal Se4 of the timer signal Se2 and the delayed timer signal Se3. Therefore, the logical sum signal Se4 becomes a high level when at least one of the timer signal Se2 and the delayed timer signal Se3 is at a high level, and becomes a low level when both the timer signal Se2 and the delayed timer signal Se3 are at a low level. The logical sum signal Se4 is used as the burst stop signal STOP.

<Burst Control>

Figure 11:
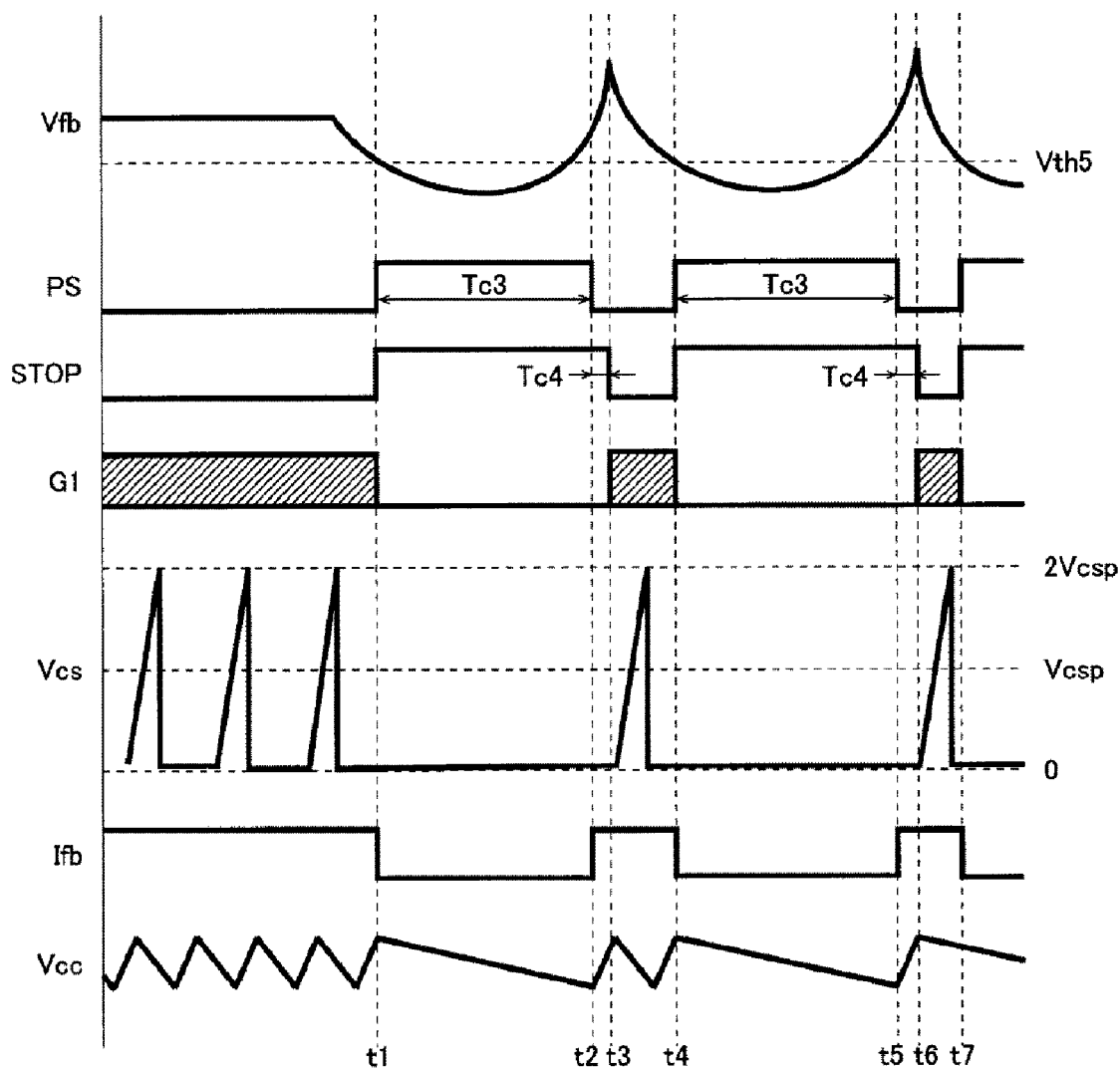
FIG. 11 is a timing diagram illustrating an example of burst control in the no-load mode.

FIG. 11 is a timing diagram illustrating an example of burst control in the no-load mode MODE3, in which from the top, the feedback voltage Vfb, the power save signal PS, the burst stop signal STOP, the gate signal G1, the sense voltage Vcs, the feedback current Ifb, and the power supply voltage Vcc are sequentially depicted.

When the feedback voltage Vfb falls below the threshold voltage Vth5 at time t1, the power save signal PS and the burst stop signal STOP rise to a high level. As a result, the gate signal G1 is fixed to a low level, the switching of the transistor N1 is stopped, and the feedback current Ifb is cut off.

When the burst stop time Tc3 elapses from time t1, the power save signal PS falls to a low level at time t2. As a result, the feedback current Ifb begins to flow. In this drawing, the feedback voltage Vfb exceeds the threshold voltage Vth5 before the burst stop time Tc3 elapses from time t1, but in the no-load mode MODE3, the power save signal PS does not fall to a low level at that time.

When the circuit recovery time Tc4 elapses from time t2, the burst stop signal STOP falls to a low level at time t3. As a result, the low level fixation of the gate signal G1 is released, and the switching of the transistor N1 is resumed.

Thereafter, when the feedback voltage Vfb again falls below the threshold voltage Vth5 at time t4, the same burst control as above is repeated.

As described above, in the burst control in the no-load mode MODE3, not only is the switching of the transistor N1 stopped, but also the feedback current Ifb flowing through the phototransistor PT is cut off during the burst stop (see, the times t1 to t3 or the like). Thus, the standby power of the power supply IC 100 (=the power consumed by the switching operation of the transistor N1+the power consumed by the self-operation of the power supply IC 100) can be greatly reduced.

In particular, when the DC output voltage Vo is lowered in the secondary circuit system 1s, the power supply voltage Vcc generated from the induced voltage Vp of the auxiliary winding L3 is also lowered. Therefore, in the power supply IC 100, the capacitor C2 is recharged by the starter 109. However, in the burst control in the no-load mode MODE3, the power consumption of the power supply IC 100 is greatly reduced and the frequency of recharging described above is suppressed to a minimum level, which does not cause deterioration of the standby power.

Further, in this drawing, it can be seen that the falling of the power supply voltage Vcc becomes gentle while the feedback current Ifb is cut off (see, times t1 to t2 or the like), and the frequency of recharging by the starter 109 is suppressed.

<Gain Adjustment Part (Peak Current Switching Part)>

Figure 12:
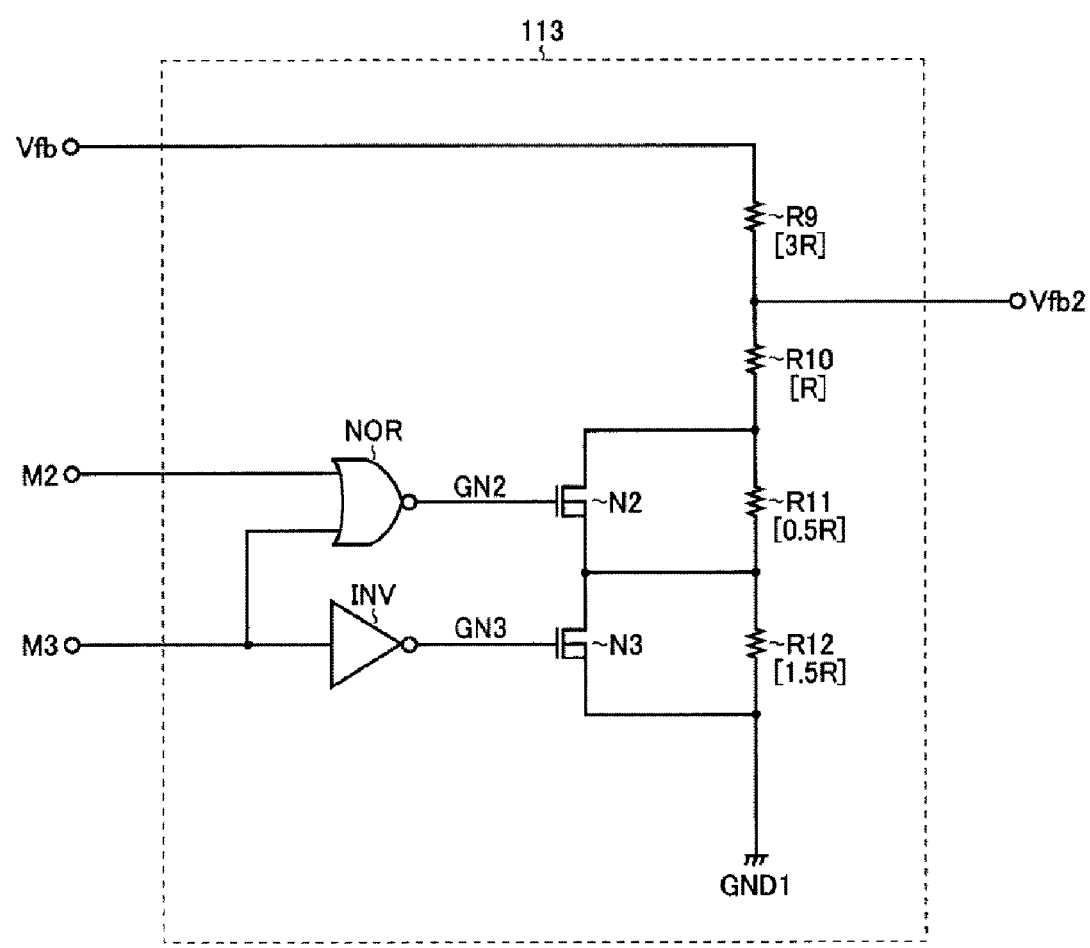
FIG. 12 is a diagram illustrating a configuration example of a gain adjustment part.

FIG. 12 is a diagram illustrating a configuration example of the gain adjustment part 113. The gain adjustment part 113 of this configuration example is a circuit block, which functions as a peak current switching part that switches the peak current value of the primary current Ip flowing through the transistor N1 for each of a plurality of operation modes, and includes resistors R9 to R12, N-channel MOS field effect transistors N2 and N3, a NOR operator NOR, and an inverter INV.

In the following description, it is assumed that the resistance value of the resistor R9 is 3R, the resistance value of the resistor R10 is R, the resistance value of the resistor R11 is 0.5R, and the resistance value of the resistor R12 is 1.5R.

A first end of the resistor R9 is connected to the input end of the feedback voltage Vfb (=the external terminal T2). A second end of the resistor R9 and a first end of the resistor R10 are connected to an output end of the divided feedback voltage Vfb2. A second end of the resistor R10 and a first end of the resistor R11 are connected to a drain of the transistor N2. The first end of the resistor R11 and a second end of the resistor R12 are connected to a source and a back gate of the transistor N2 and a drain of the transistor N3, respectively. The second end of the resistor R12 is connected to each of a source and a back gate of the transistor N3 and the ground GND1.

A gate of the transistor N2 is connected to an output terminal of the NOR gate NOR (=an output end of a gate signal GN2). Therefore, the transistor N2 is turned on when the gate signal GN2 is at a high level, and is turned off when the gate signal GN2 is at a low level.

A gate of the transistor N3 is connected to an output terminal of the inverter INV (=an output end of a gate signal GN3). Therefore, the transistor N3 is turned on when the gate signal GN3 is at a high level, and is turned off when the gate signal GN3 is at a low level.

The NOR operator NOR generates a NOR-operated signal of the mode signals M2 and M3 and outputs it as the gate signal GN2. Therefore, the gate signal GN2 becomes a low level when at least one of the mode signals M2 and M3 is at a high level, and becomes a high level when both of the mode signals M2 and M3 are at a low level.

The inverter INV generates a logically inverted signal of the mode signal M3 and outputs it as the gate signal GN3. Therefore, the gate signal GN3 becomes a low level when the mode signal M3 is at a high level, and becomes a high level when the mode signal M3 is at a low level.

In the gain adjustment part 113 having the aforementioned configuration, when the power supply IC 100 is in the normal mode MODE1, it becomes that M2=M3=L and GN2=GN3=H, so that N2=N3=ON. Thus, the gain $\alpha$ becomes "1/4 (=R/(3R+R))."

On the other hand, when the power supply IC 100 is in the light-load mode MODE2, it becomes that M2=H, M3=L, GN2=L, and GN3=H, so that N2=OFF and N3=ON. Thus, the gain $\alpha$ becomes "1/3 (=(R+0.5R)/(3R+R+0.5R))."

Further, when the power supply IC 100 is in the no-load mode MODE3, it becomes that M2=L, M3=H, and GN2=GN3=L, so that it becomes that N2=N3=OFF. Thus, the gain $\alpha$ becomes "1/2 (=(R+0.5R+1.5R)/(3R+R+0.5R+1.5R))."

From the following equation (1), it can be seen that the peak current value of the primary current Ip is also switched by switching the gain $\alpha$.

$$Ip=Vcs/Rs=\alpha \times Vfb/Rs \qquad \text{Eq. (1)}$$

That is, in the light-load mode MODE2, since the peak current value of the primary current Ip can be increased to 1.33 times by switching to $\alpha$=1/3, compared with the normal mode MODE1 ($\alpha$=1/4), it is possible to improve the efficiency at light load.

Further, in the no-load mode MODE3, since the peak current value of the primary current Ip can be increased to 2 times by switching to $\alpha$=1/2, compared with the normal mode MODE1 ($\alpha$=1/4), it is possible to improve the efficiency at no-load.

<Peak Current Switching>

In the foregoing description, the configuration in which the peak current value of the primary current Ip is switched for each of the operation modes of the power supply IC 100 has been illustrated as an example. However, it may not be necessary to perform the peak current switching (gain adjustment) in combination with the operation mode switching of the power supply IC 100 and high efficiency at light load (standby) can be realized by increasing the peak current value of the primary current Ip at the time of light-load detection.

In addition, as a method of light-load detection, for example, when the feedback voltage Vfb falls below the threshold voltage Vth5, the burst detection signal S5 rises to a high level and the burst control of the transistor N1 by the controller 110 starts, the peak current value of the primary current Ip may be increased by detecting that the load is light.

Further, for example, after the start of the burst control of the transistor N1 by the controller 110, when the burst stop period of the transistor N1 (=a period during which the feedback voltage Vfb falls below the threshold voltage Vth5) becomes longer than a predetermined value, the peak current value of the primary current Ip may be increased by detecting that the load is light.

In addition, it is possible to increase the peak current value of the primary current Ip, for example, by detecting that the peak voltage value of the sense voltage Vcs is lowered or the ON period Ton of the transistor N1 is shortened.

On the other hand, as a method of switching the peak current, as described above, the peak current value of the primary current Ip may be increased by adjusting the gain $\alpha$ of the feedback voltage Vfb (=the voltage division ratio).

<Package Layout>

Figure 13:
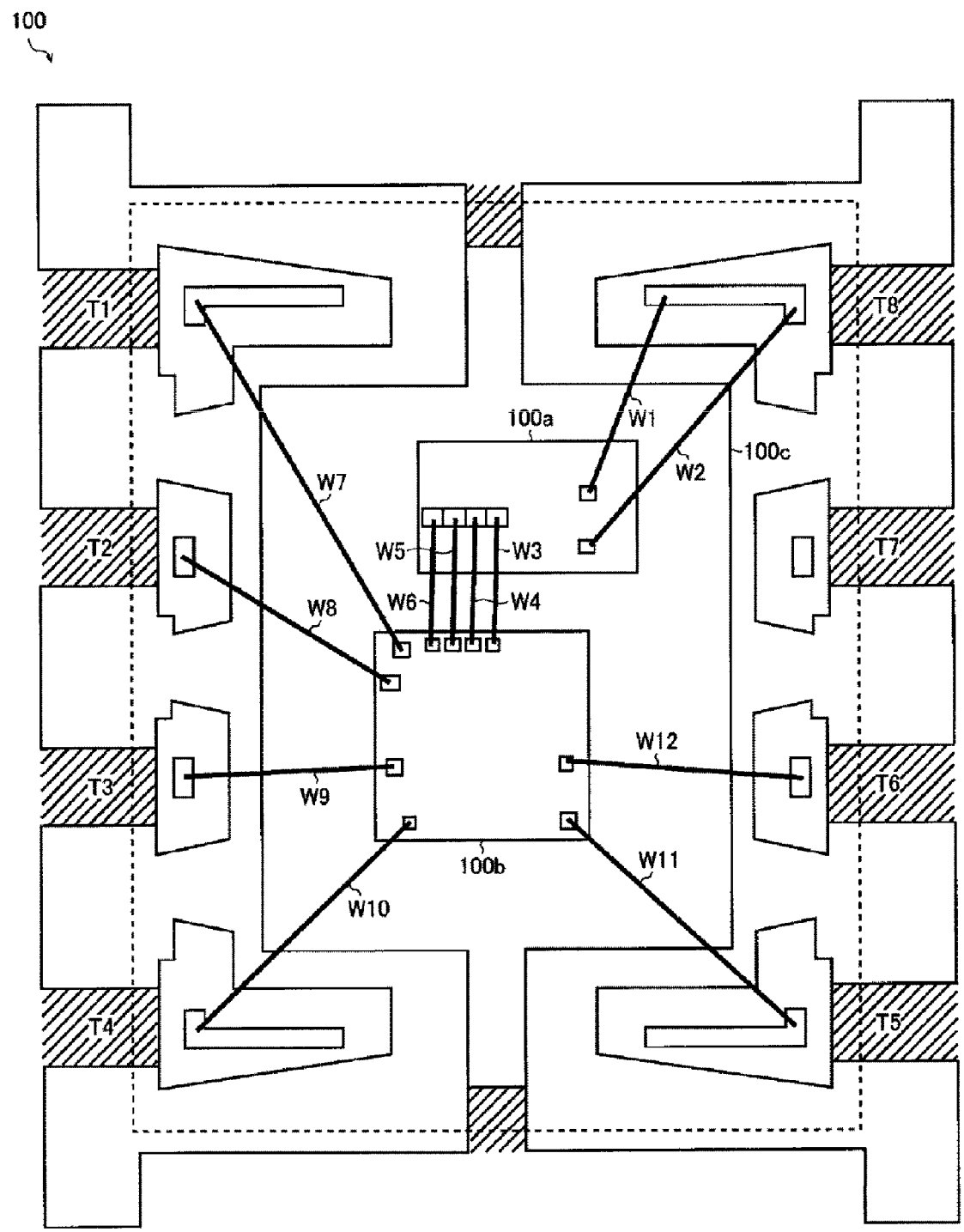
FIG. 13 is a diagram illustrating an example of package layout.

FIG. 13 is a diagram (XZ plan view) illustrating an example of a package layout. In a power supply IC 100 in this drawing, a first chip 100a and a second chip 100b are mounted on an island 100c.

In the first chip 100a, a circuit block requiring a high breakdown voltage (for example, the starter 109 that receives an input high voltage VH, or the like) is integrated. The first chip 100a is connected to the external terminal T8 via wires W1 and W2. Also, the first chip 100a is connected to the second chip 100b via wires W3 to W6.

In the second chip 100b, the circuit blocks (101 to 108 and 110 to 119) other than the foregoing blocks are integrated. The second chip 100b is connected to the respective external terminals T1 to T6 via wires W7 to W12.

Further, in the package layout of this drawing, on the island 100c, the first chip 100a is arranged on its second side (=a side close to 5th to 7th pins) in a biased manner, and the second chip 100b is arranged on its first side (=a side close to 1st to 4th pins) in a biased manner. By adopting such a package layout, it is possible to bury the wires W1 to W12 as short as possible.

Next, the reason why the power supply IC 100 does not have a one-chip configuration but has a two-chip configuration will be described. When circuit blocks requiring a high breakdown voltage and other circuit blocks are arranged in a one-chip configuration, it is necessary to prepare a buffer region between the high breakdown voltage process region and the low breakdown voltage process region. Therefore, the chip size becomes very large, which results in a significant cost increase.

On the other hand, when the power supply IC 100 has a two-chip configuration, it is not necessary to prepare a buffer region in either of the first chip 100a and the second chip 100b, so that it is possible to reduce each chip size, which results in a reduction in cost. Further, since the first chip 100a and the second chip 100b are separated, it is also very advantageous in terms of breakdown voltage.

<Minimum ON Width Switching>

Assuming that the inductance of the primary winding L1 is Lp and a switching frequency is Fsw, the power consumption P of the transistor N1 may be expressed by the following equation (2).

$$P = \tfrac{1}{2} \times Lp \times Ip^2 \times Fsw \qquad \text{Eq. (2)}$$

From Eq. (2) above, as the peak current value of the primary current Ip becomes lower, the switching frequency Fsw becomes higher. Therefore, since the number of times of switching of the transistor N1 is increased, the switching loss is increased.

In order to increase the efficiency of the isolated switching power supply 1, it is necessary to reduce the number of times the transistor N1 is switched. As a method for this, aforementioned FIGS. 7 and 9 have proposed the method of switching the peak current value of the primary current Ip by adjusting the gain α (=the voltage division ratio) of the feedback voltage Vfb at the time of light-load detection, but the peak current value of the primary current Ip may also be switched by adjusting the minimum ON width of the transistor N1. This will be described in detail below.

Figure 14:
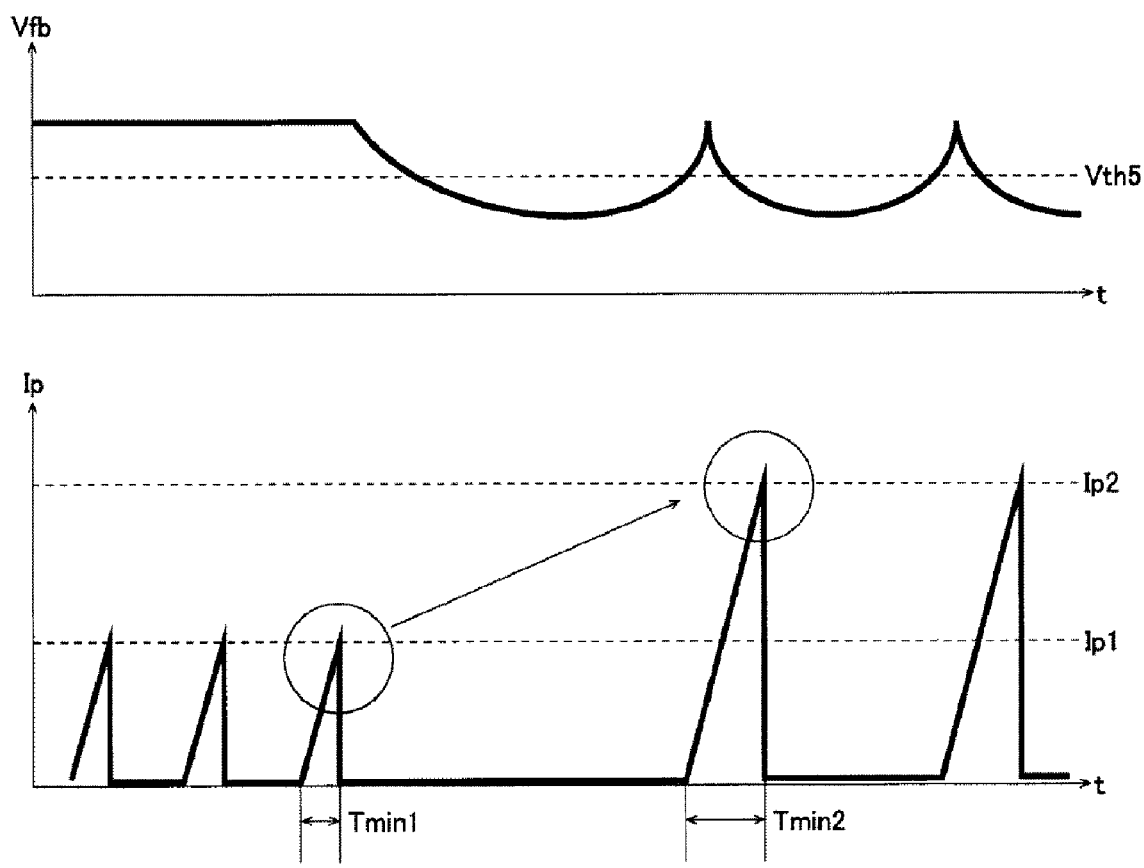
FIG. 14 is a timing diagram illustrating an example of peak current control by switching of a minimum ON width.

FIG. 14 is a timing diagram illustrating an example of peak current control by switching of the minimum ON width. The feedback voltage Vfb is depicted in the upper stage and the primary current Ip is depicted in the lower stage.

As illustrated in the drawing, the peak current value of the primary current Ip can be changed from Ip1 to Ip2 by changing the minimum ON width of the transistor N1 from Tmin1 to Tmin2. The peak current values Ip1 and Ip2 may be expressed by the following equations (2a) and (2b), respectively.

$$Ip1 = Vfb \times \frac{\alpha}{R3} \qquad \text{Eq. (2a)}$$

$$Ip2 = \frac{Vi}{Lp} \times T\min2 \qquad \text{Eq. (2b)}$$

From Eqs. (2a) and (2b) above, since the peak current value of the primary current Ip can be increased by increasing the minimum ON width of the transistor N1, it is possible to reduce the number of times the transistor N1 is switched and further to reduce the switching loss.

In particular, by increasing the minimum ON width at the time of light-load detection and increasing the peak current value of the primary current Ip, it is possible to realize high efficiency at light load (standby).

Further, as a method of light-load detection, for example, when the feedback voltage Vfb falls below the threshold voltage Vth5, the burst detection signal S5 rises to a high level, and the burst control of the transistor N1 by the controller 110 starts, the peak current value of the primary current Ip may be increased by detecting that the load is light.

In addition, for example, when a burst stop period of the transistor N1 (=a period during which the feedback voltage Vfb falls below the threshold voltage Vth5) becomes longer than a predetermined value after the start of the burst control of the transistor N1 by the controller 110, the peak current value of the primary current Ip may be increased by detecting that the load is light.

Further, it is possible to increase the peak current value of the primary current Ip, for example, by detecting that the peak voltage value of the sense voltage Vcs is lowered or the ON period Ton of the transistor N1 is shortened.

Hereinafter, a configuration and an operation of a minimum ON width setting part that sets the minimum ON width of the transistor N1 according to the loads will be described in detail with reference to specific examples.

<Minimum ON Width Setting Part>

Figure 15:
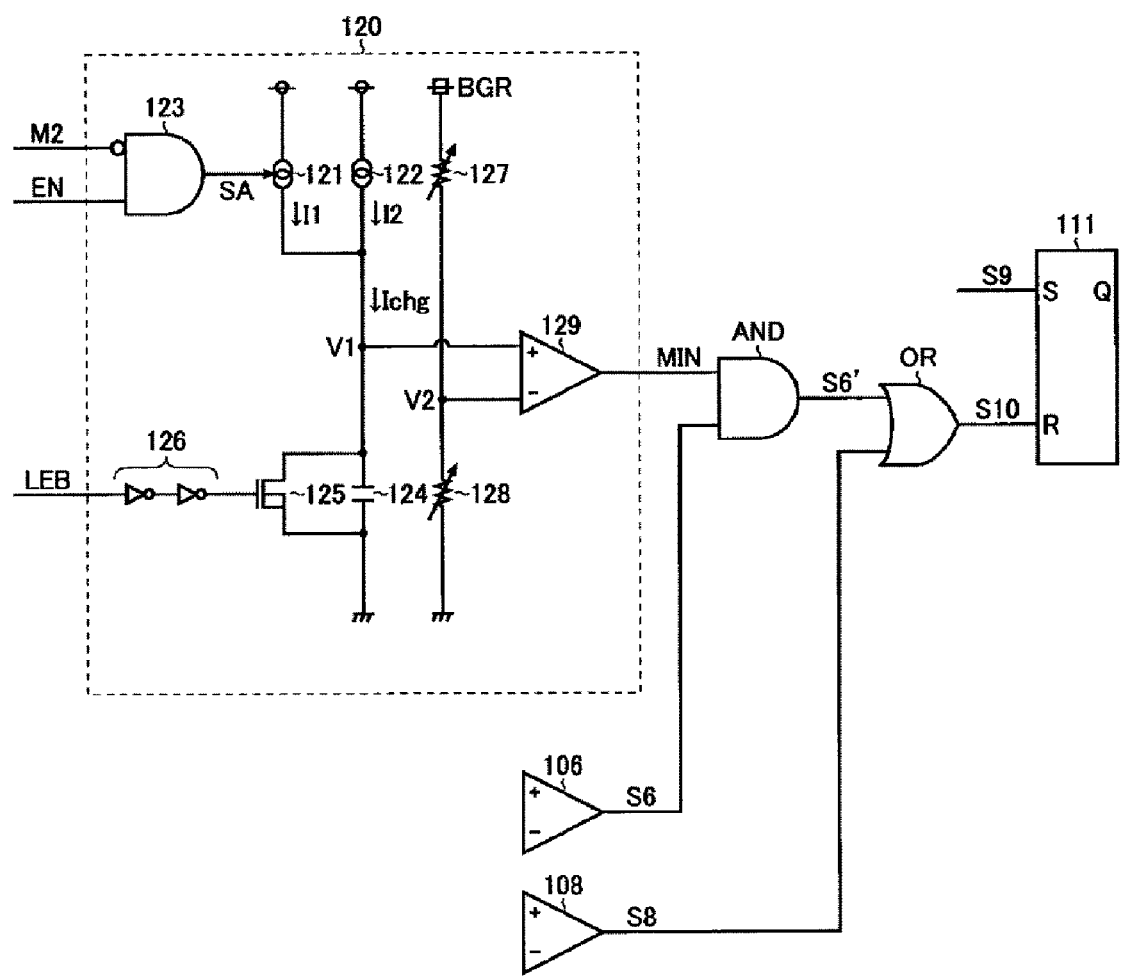
FIG. 15 is a diagram illustrating a first example of a minimum ON width setting part.

FIG. 15 is a diagram illustrating a first example of the minimum ON width setting part. A minimum ON width setting part 120 of this example includes current sources 121 and 122, an AND operator 123, a capacitor 124, an N-channel MOS field effect transistor 125, an inverter stage 126, variable resistors 127 and 128, and a comparator 129.

The current source 121 is connected between a power supply terminal and a first end of the capacitor 124 (=an output end of a voltage V1), and generates a current I1 that is turned on and off depending on a logical product signal SA input from the AND operator 123. More specifically, the current source 121 turns on the current I1 (e.g., I1=1.0 A) when SA=H, and turns off the current I1 (I1=0 A) when SA=L.

The current source 122 is connected between the power supply terminal and the first end of the capacitor 124 (=the output end of the voltage V1), and generates a current I2 (e.g., I2=0.5 μA) that is always turned on.

The AND operator 123 generates the logical product signal SA of the mode signal M2 input to its inverting input terminal and the enable signal EN input to its non-inverting input terminal. Therefore, the logical product signal SA becomes a high level in the mode (M2=L) other than the light-load mode, and becomes a low level in the light-load mode (M2=H) during the enable period (EN=H) of the power supply IC 100. Further, the logical product signal SA is fixed to a low level regardless of the logic level of the mode signal M2 during the disable period (EN=L) of the power supply IC 100.

In addition, the current sources 121 and 122 and the AND operator 123 function as a charging current generation part that generates a charging current Ichg of the capacitor 124 according to the load. Here, the charging current Ichg becomes an added current (=I1+I2) obtained by adding the current I1 and the current I2. Thus, the charging current Ichg is increased or decreased according to the ON/OFF state of the current I1.

More specifically, in the mode (M2=L) other than the light-load mode, since the current I1 is turned on, the charging current Ichg becomes 1.5 μA (=1.0 μA+0.5 μA). On the other hand, in the light-load mode (M2=H), since the logical product signal SA becomes a low level, the charging current Ichg can be lowered to 0.5 μA.

The first end of the capacitor 124 is connected to a non-inverting input terminal (+) of the comparator 129. A second end of the capacitor 124 is connected to a ground. That is, the voltage across the capacitor 124 is output as the voltage V1. Further, the slope of the voltage V1 during the charging period of the capacitor 124 is determined depending on the charging current Ichg.

More specifically, in the mode (M2=L) other than the light-load mode, since the charging current Ichg becomes 1.5 µA, the slope of the voltage V1 becomes steep, and in the light-load mode (M2=H), since the charging current Ichg is pulled down to 0.5 µA, the slope of the voltage V1 becomes gentle.

A drain of the transistor 125 is connected to the first end of the capacitor 124. A source and a back gate of transistor 125 are connected to a second end of capacitor 124. A turn-on signal LEB is input to a gate of the transistor 125 via the inverter stage 126 (two stages in this drawing).

The turn-on signal LEB is a one-shot pulse signal that rises to a high level only for a predetermined reset period (e.g., 300 ns) at the ON timing of the transistor N1. Therefore, at the ON timing of the transistor N1, the transistor 125 is turned on and the capacitor 124 is discharged. In this manner, the transistor 125 functions as a discharge switch that discharges the capacitor 124 at the ON timing of the transistor N1.

The components (the current sources 121 and 122, the AND operator 123, the capacitor 124, the transistor 125, and the inverter stage 126) described so far may be understood as components of a first voltage generation part that generates the voltage V1 varying with a slope corresponding to the load.

The variable resistors 127 and 128 are connected in series between an application end of a band gap reference voltage BGR (e.g., 1.2 V) and the ground, and function as a second voltage generation part (=voltage division circuit) that outputs a predetermined voltage V2 (e.g., 0.6 V) from a connection node between them. Further, the variable resistors 127 and 128 can finely adjust their respective resistance values with a predetermined gradation degree (e.g., ±3 bits).

The comparator 129 compares the voltage V1 input to its non-inverting input terminal (+) and the voltage V2 input to its inverting input terminal (−) to generate a minimum ON width setting signal MIN. The minimum ON width setting signal MIN becomes a low level when V1<V2, and becomes a high level when V1>V2.

The minimum ON width setting signal MIN is input to an AND operator AND together with the OFF timing signal S6 generated by the comparator 106. The AND operator AND generates a logical product signal S6' of the minimum ON width setting signal MIN and the OFF timing signal S6.

Further, the logical product signal S6' becomes a high level when both the minimum ON width setting signal MIN and the OFF timing signal S6 are at a high level, and becomes a low level when at least one of the minimum ON width setting signal MIN and the OFF timing signal S6 is at a low level.

That is, even when the OFF timing signal S6 rises to a high level, the logical product signal S6' remains at a low level unless the minimum ON width setting signal MIN rises to a high level at that time.

The logical product signal S6' is input to an OR operator OR together with the overcurrent detection signal S8 generated by the comparator 108. The OR operator OR generates a logical sum signal of the logical product signal S6' and the overcurrent detection signal S8, and outputs it as a reset signal S10 to a reset terminal R of the RS flip-flop 111.

Further, the reset signal S10 becomes a high level when at least one of the logical product signal S6' and the overcurrent detection signal S8 is at a high level, and becomes a low level when both the logical product signal S6' and the overcurrent detection signal S8 are at a low level.

That is, the reset signal S10 is fixed to a high level regardless of the logic level of the AND signal S6' when the overcurrent detection signal S8 is at a high level (=a logic level at the time of overcurrent detection).

Further, the AND operator AND and the OR operator OR may be understood as the components of the controller 110, respectively.

Figure 16:
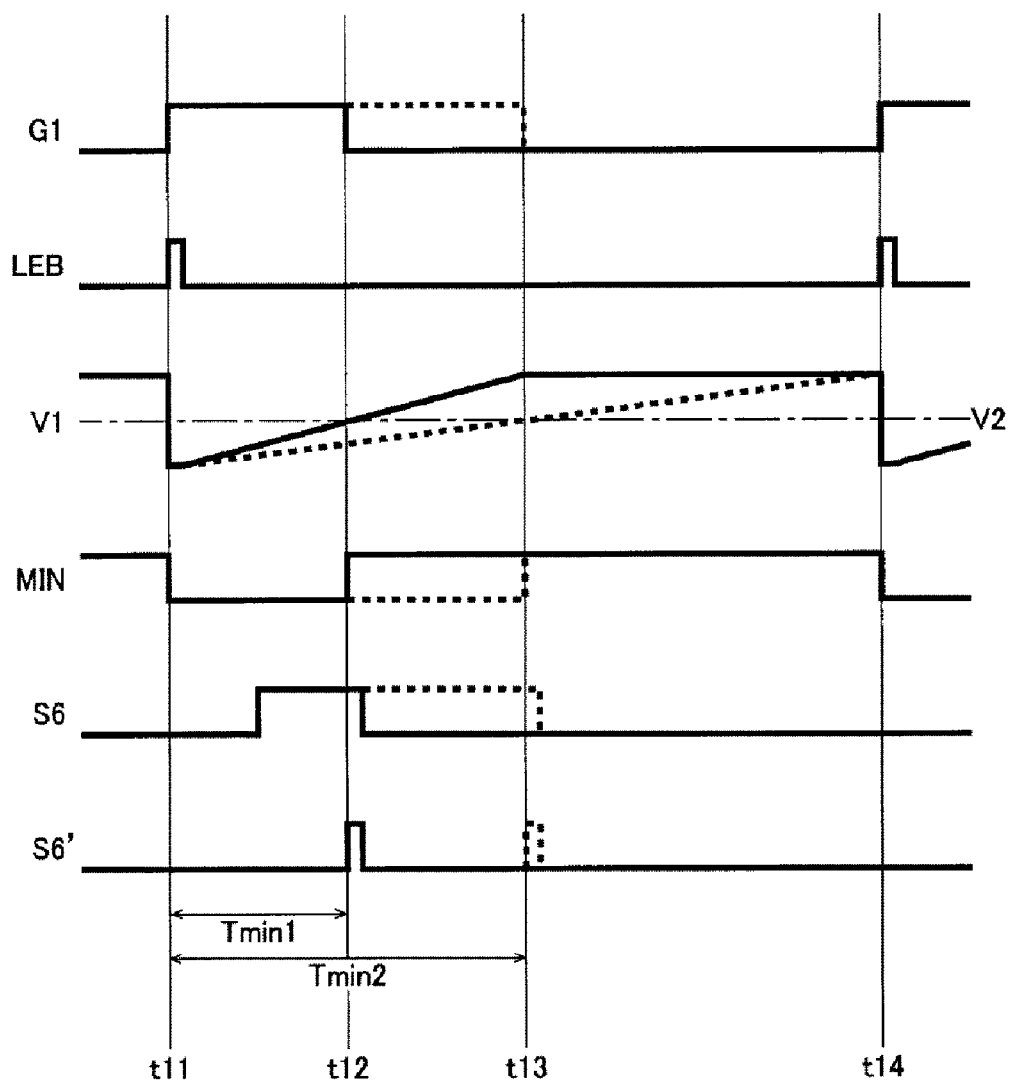
FIG. 16 is a timing diagram illustrating an example of a minimum ON width switching operation.

FIG. 16 is a timing diagram illustrating an example of the minimum ON width switching operation, in which from the top, the gate signal G1, the turn-on signal LEB, the voltage V1 (and V2), the minimum ON width setting signal MIN, the OFF timing signal S6, and the logical product signal S6' are sequentially depicted. Further, the solid lines in this drawing indicate M2=L (I1: ON) and also indicate a behavior at M2=L (I1: ON), and the broken lines in this drawing indicate a behavior at M2=H (I1: OFF).

When the gate signal G1 rises to a high level at time t11, a one-shot pulse is generated in the turn-on signal LEB. As a result, the voltage V1 is lowered to a zero value, and thereafter starts to rise with a slope corresponding to the charging current Ichg.

The minimum ON width setting signal MIN falls from a high level to a low level at the timing that the voltage V1 is reset to a zero value, and thereafter rises again from a low level to a high level at the timing that the voltage V1 becomes higher than the voltage V2.

Here, since the charging current Ichg becomes 1.5 µA (=I1+I2) in the mode (M2=L) other than the light-load mode, the slope of the voltage V1 becomes steep (see the solid line of V1). As a result, the voltage V1 exceeds the voltage V2 at time t12, and the minimum ON width setting signal MIN rises from a low level to a high level (see the solid line of MIN). In this case, the times t11 to t12 correspond to the minimum ON width Tmin1.

On the other hand, in the light-load mode (M2=H), since the charging current Ichg is lowered to 0.5 µA (=I2 only), the slope of the voltage V1 becomes gentle (see the broken line of V1). Therefore, the voltage V1 exceeds the voltage V2 just at time t13 later than the time t12, and the minimum ON width setting signal MIN rises from a low level to a high level (see the broken line of MIN). In this case, the times t11 to t13 correspond to the minimum ON width Tmin2 (>Tmin1).

Further, in this drawing, the OFF timing signal S6 rises to a high level during the low level period of the minimum ON width setting signal MIN (see times t11 to t12). However, as described above, the logical product signal S6' remains at a low level unless the minimum ON width setting signal MIN rises to a high level. Therefore, the transistor N1 is not turned off, and the minimum ON width Tmin1 (further Tmin2) is maintained.

As described above, in the light-load mode (M2=H), it is possible to realize high efficiency at light load (standby) by increasing the minimum ON width Tmin1 and increasing the peak current value of the primary current Ip.

Further, the same operation as above is repeated even after time t14.

Figure 17:
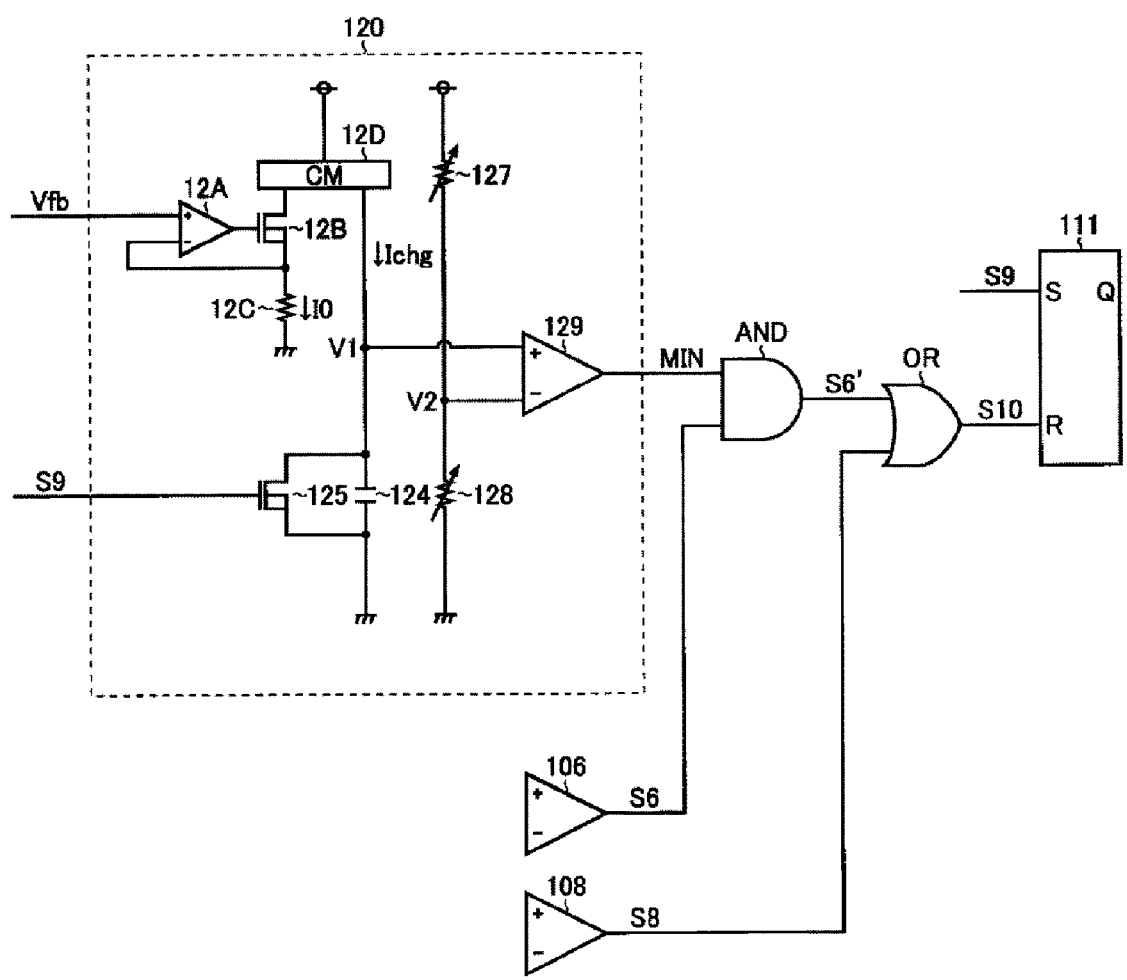
FIG. 17 is a diagram illustrating a second example of the minimum ON width setting part.

FIG. 17 is a diagram illustrating a second example of the minimum ON width setting part 120. The minimum ON width setting part 120 of this example is based on the first example (FIG. 15) described above, and includes an operational amplifier 12A, an N-channel MOS field effect transistor 12B, a resistor 12C, and a current mirror 12D, instead of the current sources 121 and 122 and the AND operator 123. That is, the configuration of the charging current generation part is modified. Hereinafter, description will be made focused on the modification.

The feedback voltage Vfb is input to a non-inverting input terminal (+) of the operational amplifier 12A. An output terminal of the operational amplifier 12A is connected to a gate of the transistor 12B. An inverting input terminal (−) of the operational amplifier 12A is connected to a source and a back gate of the transistor 12B and a first end of the resistor 12C. A second end of the resistor 12C is connected to a ground terminal. A drain of the transistor 12B is connected to a current input terminal of the current mirror 12D. A current output terminal of the current mirror 12D is connected to the first end of the capacitor 124 (=an output end of the voltage V1).

The operational amplifier 12A performs gate control of the transistor 12B such that the non-inverting input terminal (+) and the inverting input terminal (−) are imaginarily short-circuited. Therefore, a voltage equivalent to the feedback voltage Vfb is applied to the first end of the resistor 12C. As a result, a current signal I0 (=Vfb/R12C) corresponding to the feedback voltage Vfb flows through the resistor 12C (resistance value: R12C).

That is, the operational amplifier 12A, the transistor 12B, and the resistor 12C function as a voltage/current conversion part that converts the feedback voltage Vfb (=corresponding to an output detection signal which is a voltage signal) into the current signal I0.

The current mirror generates a mirror current corresponding to the current signal I0 and outputs it as the charging current Ichg.

When the load is lightened and the feedback voltage Vfb is lowered, the current signal I0 is decreased. Therefore, since the charging current Ichg is decreased, the slope of the voltage V1 becomes gentle. As a result, since the timing of crossing the voltage V1 and the voltage V2 is delayed, the minimum ON width Tmin becomes large.

That is, in the minimum ON width setting part 120 of the second example, it becomes possible to set the minimum ON width Tmin to be larger as the load is lighter.

Further, in the minimum ON width setting part 120 of the second example, the aforementioned inverter stage 126 is removed, and the set signal S9, instead of the turn-on signal LEB, is directly input to the gate of the transistor 125. With this configuration, the one-shot circuit for generating the turn-on signal LEB is omitted and the circuit scale can be reduced.

<Other Modifications>

Further, various technical features disclosed herein, in addition to the aforementioned embodiments, may be differently modified without departing from the spirit of the present disclosure. That is, it should be considered that the aforementioned embodiments are illustrative in all respects and are intended not to limit the scope of the disclosure, and the technical scope of the present disclosure is not limited to the description of the aforementioned embodiments but may be determined based on claims and is to be understood to include all modifications that fall within the meaning and range equivalent to the scope of claims.

The present disclosure described herein can be used for an isolated switching power supply used in all fields (such as a home electronics field, an automobile field, an industrial machine field, and the like).

According to the present disclosure in some embodiments, it is possible to provide a power supply control device capable of reducing power consumption at light load or no load.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A power supply control device as a main control unit of a switching power supply, comprising:
   a minimum ON width setting part including:
      a first voltage generation part configured to generate a first voltage that varies with a slope corresponding to a load;
      a second voltage generation part configured to generate a predetermined second voltage that is a constant voltage; and
      a comparator configured to compare the first voltage with the predetermined second voltage to generate a minimum ON width setting signal,
   wherein the minimum ON width setting part is configured to set a minimum ON width of an output switch based on the minimum ON width setting signal such that the minimum ON width is increased when the load is lighter.

2. The power supply control device of claim 1, wherein the first voltage generation part includes:
   a capacitor configured to generate a voltage at one end of the capacitor as the first voltage;
   a charging current generation part configured to generate a charging current of the capacitor according to the load; and
   a discharge switch configured to discharge the capacitor at an ON timing of the output switch.

3. The power supply control device of claim 2, wherein the charging current generation part includes:
   a first current source configured to generate a first current that is turned on and off according to the load; and
   a second current source configured to generate a second current that is always turned on, and
   wherein the charging current is generated by adding the first current and the second current.

4. The power supply control device of claim 2, wherein the charging current generation part is configured to convert an output detection signal corresponding to a difference value between a DC output voltage to the load and a target value into a current signal, and output the current signal as the charging current.

5. The power supply control device of claim 4, wherein the charging current generation part includes:
   a voltage/current conversion part configured to convert the output detection signal, which is a voltage signal, into the current signal; and
   a current mirror configured to generate the charging current by mirroring the current signal.

6. The power supply control device of claim 1, wherein the switching power supply is an isolated type, and a peak current value of a primary current flowing through the output switch is increased as the minimum ON width increases.

7. The switching power supply, comprising:
   the power supply control device of claim 1; and
   a switching output stage controlled by the power supply control device.

8. An electronic device, comprising:
   the switching power supply of claim 7; and a load configured to operate by receiving electric power supplied from the switching power supply.

* * * * *